US012631261B1

(12) United States Patent
Lerner et al.

(10) Patent No.: US 12,631,261 B1
(45) Date of Patent: May 19, 2026

(54) FLOAT-ACTUATED FLUID VALVE ASSEMBLY

(71) Applicant: A.O. International II, Inc., Stafford, TX (US)

(72) Inventors: Andrew Lerner, Houston, TX (US); Ranjit K. Singh, Houston, TX (US); Daniel Maurice Lerner, Missouri City, TX (US)

(73) Assignee: A.O. International II, Inc., Stafford, TX (US)

( * ) Notice: Subject to any disclaimer, the term of this patent is extended or adjusted under 35 U.S.C. 154(b) by 0 days.

(21) Appl. No.: 19/391,237

(22) Filed: Nov. 17, 2025

(51) Int. Cl.
    *F16K 21/18* (2006.01)
    *F16K 31/20* (2006.01)
(52) U.S. Cl.
    CPC .............. *F16K 21/18* (2013.01); *F16K 31/20* (2013.01)
(58) Field of Classification Search
    CPC .......... F16K 21/18; F16K 31/24; F16K 31/20; F16K 31/28
    See application file for complete search history.

(56) References Cited

U.S. PATENT DOCUMENTS

| 876,867 | A | * | 1/1908 | Duggan | ................... | F16K 31/20 |
| | | | | | | 137/430 |
| 1,182,903 | A | * | 5/1916 | Grossmann | ............. | F16K 31/22 |
| | | | | | | 137/433 |

| 2,210,331 | A | * | 8/1940 | Bindernagel | ........... | F16K 31/20 |
| | | | | | | 137/437 |
| 2,277,837 | A | * | 3/1942 | Auld | ....................... | F16K 31/24 |
| | | | | | | 137/122 |
| 2,362,731 | A | * | 11/1944 | Stanley | ................... | F16K 21/18 |
| | | | | | | 417/40 |
| 2,384,628 | A | * | 9/1945 | Krone | ................... | B61D 5/008 |
| | | | | | | 251/293 |
| 2,412,452 | A | * | 12/1946 | Green | ..................... | F16K 31/20 |
| | | | | | | 4/405 |
| 2,614,576 | A | * | 10/1952 | Taylor | .................... | F16K 31/30 |
| | | | | | | 137/122 |

(Continued)

FOREIGN PATENT DOCUMENTS

| CA | 2866181 A1 | 9/2013 |
| FR | 2335765 A1 * | 7/1977 |

(Continued)

*Primary Examiner* — David Colon-Morales
(74) *Attorney, Agent, or Firm* — ePatentManager.com; Guerry L. Grune

(57) ABSTRACT

A float-actuated fluid valve assembly is disclosed that controls fluid flow from one or more fuel holding tanks, comprising a valve body having an inlet port and an outlet port, a floating piston movably disposed within the valve body, a poppet positioned within the valve body and configured to selectively seal against a valve seat to control fluid flow between the inlet port and the outlet port, a float assembly operatively connected to the floating piston through a wire rope, cable or cord wherein the float assembly responds to changes in fluid level to actuate movement of the floating piston, which controls positioning of the poppet relative to the valve seat, and a set of compression springs positioned to bias the floating piston. The float assembly in ruggedized form includes a float cage having a top cap and a bottom cap connected by connecting rods.

31 Claims, 14 Drawing Sheets

INITIAL POSITION
(FUEL TANK FULL)

(56)                References Cited

U.S. PATENT DOCUMENTS

| | | | | |
|---|---|---|---|---|
| 2,886,056 | A * | 5/1959 | Ratliff | F16K 31/24 |
| | | | | 137/430 |
| 3,174,503 | A * | 3/1965 | Absolon | F16K 21/18 |
| | | | | 137/393 |
| 3,202,174 | A * | 8/1965 | Rudelick | F16K 31/22 |
| | | | | 210/123 |
| 3,963,041 | A * | 6/1976 | McGillis | F16K 21/18 |
| | | | | 137/410 |
| 4,191,208 | A * | 3/1980 | Mylander | F16K 21/18 |
| | | | | 137/158 |
| 4,266,582 | A * | 5/1981 | Sergent | B67D 7/365 |
| | | | | 251/38 |
| 4,360,038 | A * | 11/1982 | Trinkwalder, Jr. | F16K 37/00 |
| | | | | 141/DIG. 1 |
| 5,386,844 | A * | 2/1995 | Kennedy | F16K 24/048 |
| | | | | 137/430 |
| 5,992,448 | A * | 11/1999 | Anderson | F16K 21/18 |
| | | | | 137/413 |
| 6,240,955 | B1 * | 6/2001 | Anderson | F16K 31/34 |
| | | | | 251/282 |
| 6,523,564 | B1 * | 2/2003 | Phillips | B67D 7/365 |
| | | | | 137/445 |

| | | | | |
|---|---|---|---|---|
| 7,174,912 | B2 * | 2/2007 | Lowe | E03C 1/052 |
| | | | | 137/434 |
| 7,219,686 | B2 * | 5/2007 | Schmitz | F16K 1/305 |
| | | | | 73/317 |
| 9,200,723 | B2 * | 12/2015 | Pulé | E03D 1/32 |
| 9,463,971 | B2 * | 10/2016 | Higgins | F16K 31/20 |
| 9,809,963 | B2 * | 11/2017 | Huang | E03D 1/00 |
| 9,981,546 | B2 | 5/2018 | Mihara et al. | |
| 10,955,277 | B2 | 3/2021 | Sheridan | |
| 11,473,619 | B2 | 10/2022 | Ah | |
| 11,845,332 | B2 | 12/2023 | Yajima et al. | |
| 11,932,101 | B2 | 3/2024 | Mihara et al. | |
| 12,066,119 | B2 | 8/2024 | Kostanski et al. | |
| 12,123,507 | B2 | 10/2024 | Zhu | |
| 12,134,314 | B2 | 11/2024 | Kon et al. | |
| 12,233,707 | B2 | 2/2025 | Thaden et al. | |
| 2024/0125102 | A1 | 4/2024 | Sobolewski et al. | |

FOREIGN PATENT DOCUMENTS

| | | | | |
|---|---|---|---|---|
| RU | 192655 | U1 | 9/2019 | |
| WO | WO-2019211701 | A1 * | 11/2019 | F16K 31/24 |
| WO | 2022/100855 | A1 | 5/2022 | |
| WO | 2024/153465 | A1 | 7/2024 | |
| WO | WO-2024145432 | A1 * | 7/2024 | E03D 1/33 |

* cited by examiner

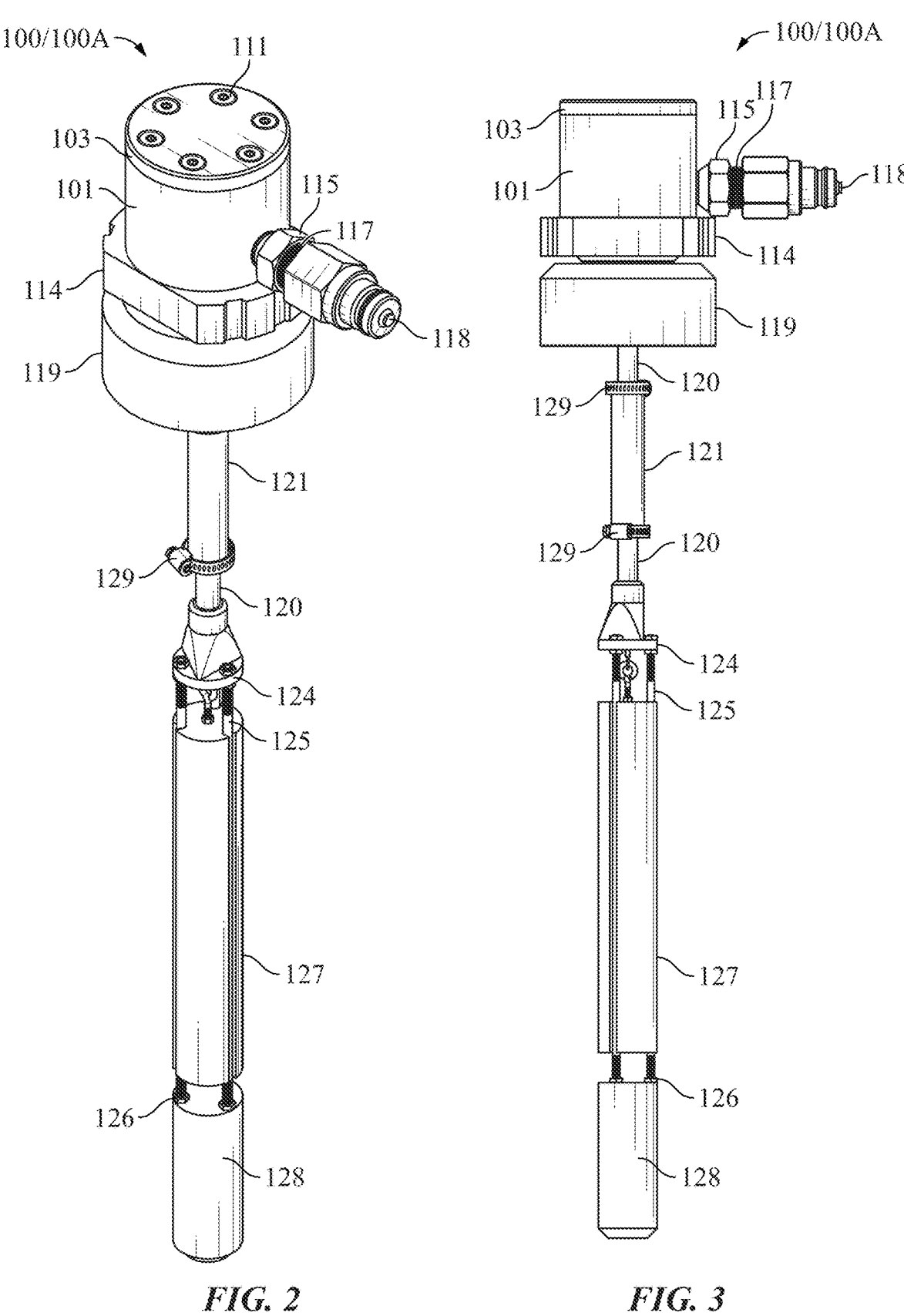
*FIG. 2*          *FIG. 3*

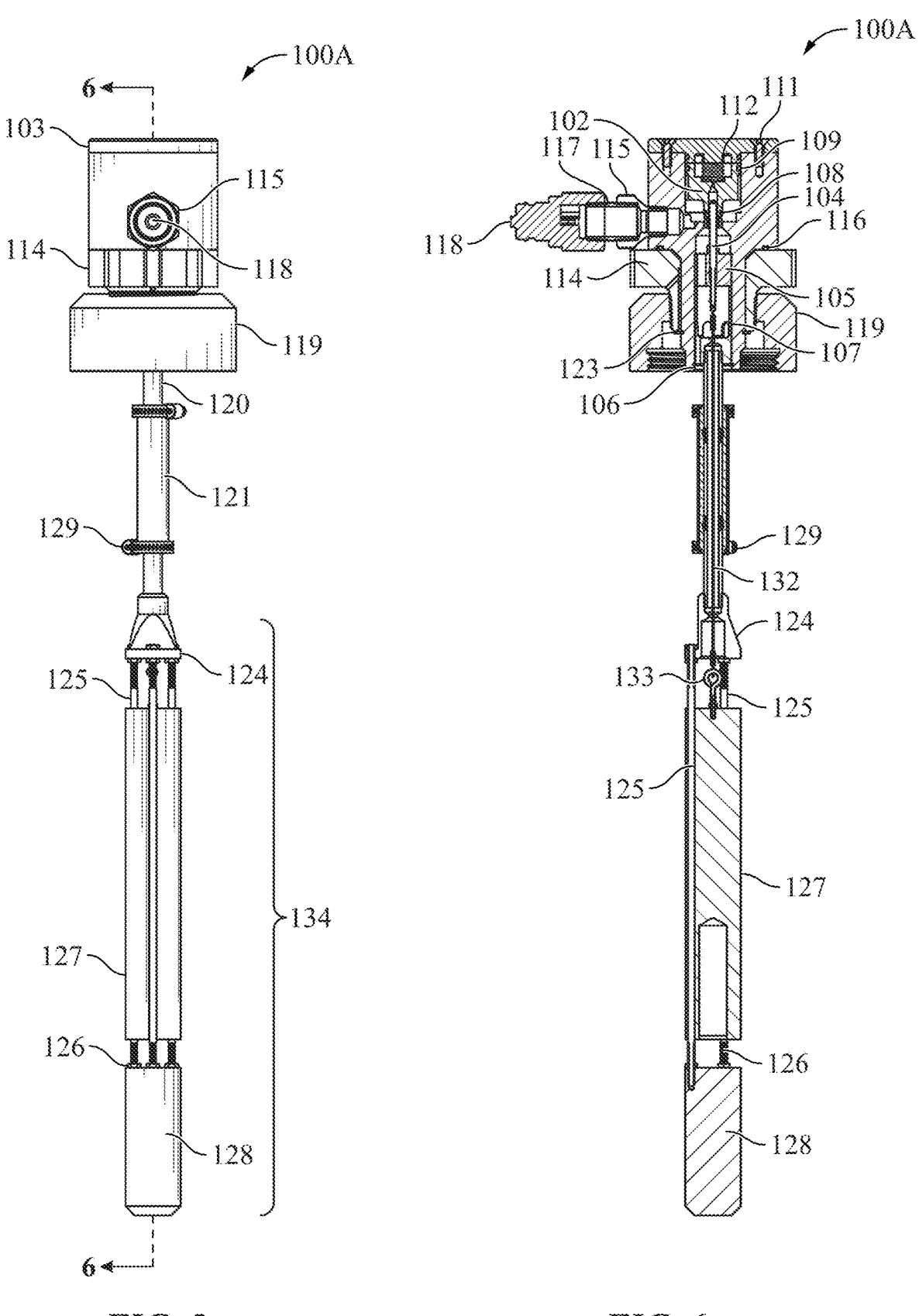
*FIG. 5*            *FIG. 6*

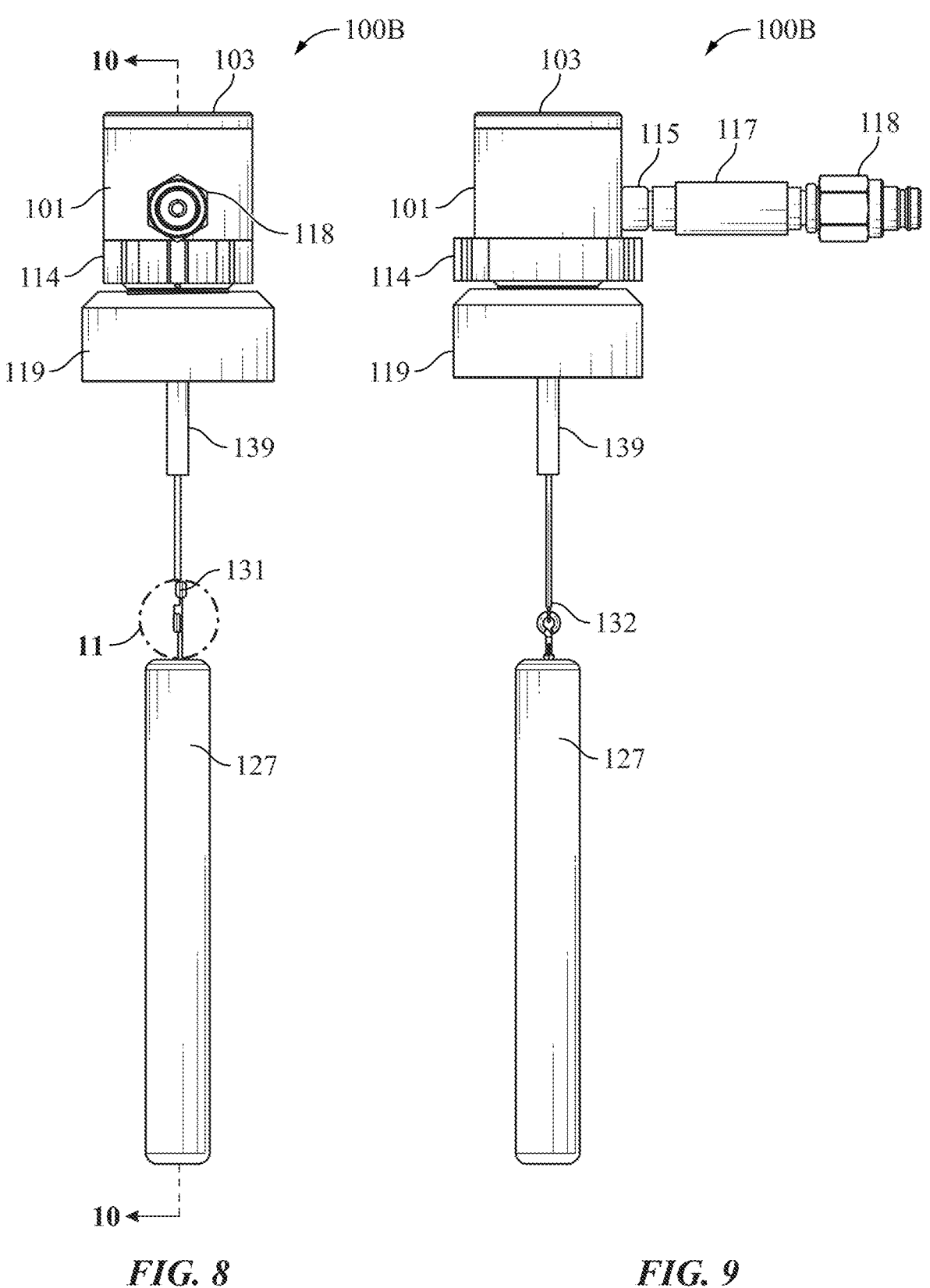
*FIG. 8*                    *FIG. 9*

131

132

133

137

135

138

110

136

102

141

137

104

INITIAL POSITION
(FUEL TANK FULL)

STARTING TO OPEN POSITION

OPEN POSITION

STARTING TO CLOSE POSITION

SEALED TO CLOSE POSITION

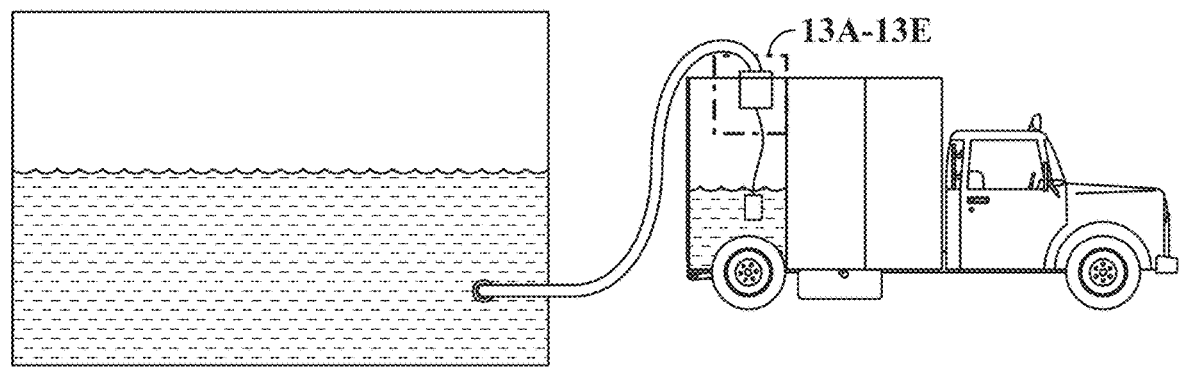
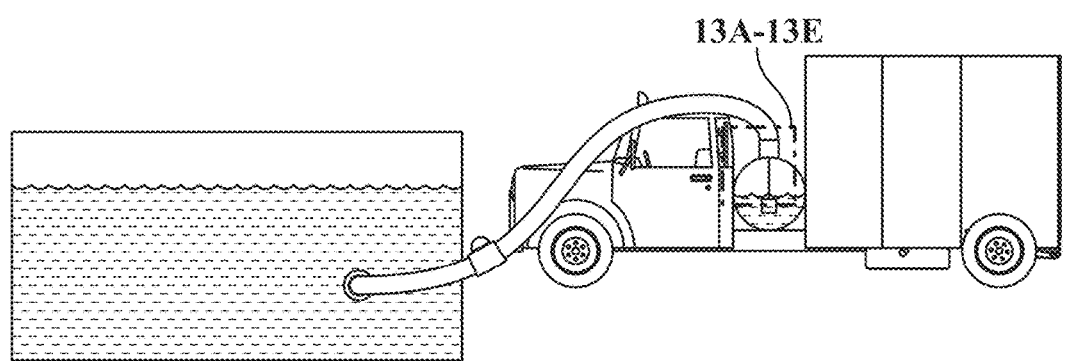
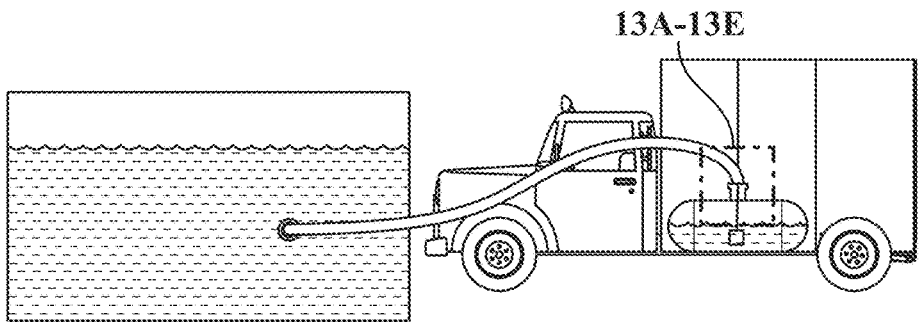
*FIG. 14*

FLOAT-ACTUATED FLUID VALVE ASSEMBLY

FIELD OF INVENTION

The present disclosure relates to fluid system valve assemblies, and more particularly to a float-actuated fluid valve assembly that utilizes a buoyant float mechanism connected through a connecting unit mechanism such as a wire rope system to control fluid flow based on liquid level changes. In many cases the fluid is a fuel which can be comprised of various densities for use by different fuel consumption engines/turbines, etc.

BACKGROUND

Fluid systems in various applications, including automotive, marine, and industrial equipment, rely on proper fluid flow control and vapor management to maintain safe and efficient operation. These systems typically incorporate valves and control mechanisms to regulate fluid delivery, prevent overflow conditions, and manage vapor emissions during fluid handling operations.

Float-actuated valve assemblies have been widely used in fluid systems to provide automatic control based on liquid levels. These assemblies generally employ buoyant elements that respond to changes in fluid level, actuating valve mechanisms to open or close flow paths as conditions change. Such assemblies serve multiple functions, including preventing tank overfilling during refluidizing operations, controlling vapor emissions, and maintaining proper pressure relationships within fluid systems.

Traditional fluid valve assemblies face various operational challenges in demanding environments. Fluid systems may be subjected to vehicle movement, temperature variations, pressure fluctuations, and exposure to different fluid compositions. These conditions can affect the reliability and responsiveness of valve mechanisms, potentially leading to improper sealing, delayed actuation, or reduced service life.

The design of float-actuated valve assemblies involves balancing multiple considerations, including sensitivity to fluid level changes, sealing performance, durability under operating conditions, and compatibility with existing fluid system components. Valve assemblies must provide reliable operation across a range of fluid types while maintaining proper sealing to prevent unwanted fluid or vapor leakage.

Modern fluid systems also face increasing demands for improved environmental compliance and safety performance. Vapor emission control has become more stringent, requiring valve assemblies that can effectively manage fluid vapors during various operating conditions. Additionally, safety considerations require valve assemblies that can respond appropriately to abnormal conditions such as vehicle rollover or impact scenarios.

The integration of float-actuated valve assemblies into fluid systems often involves considerations of installation complexity, maintenance requirements, and compatibility with existing fluid system infrastructure. Assemblies that can be readily installed and serviced while providing reliable long-term performance offer advantages in various applications.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a float-actuated fluid valve assembly is provided. The assembly includes a valve body having an inlet port and an outlet port. A piston is movably disposed within the valve body. A poppet is positioned within the valve body and configured to selectively seal against a valve seat to control fluid flow between the inlet port and the outlet port. A poppet guide directs movement of the poppet within the valve body. A valve body cap secures components within the valve body. A float assembly is operatively connected to the piston through a connecting mechanism, wherein the float assembly responds to changes in fluid level to actuate movement of the piston, which controls positioning of the poppet relative to the valve seat. A wire rope extends between the float assembly and the piston as part of the connecting mechanism.

According to other aspects of the present disclosure, the assembly may include one or more of the following features. The wire rope may be secured using compression sleeves. The compression sleeves may be positioned at both ends of the wire rope. The assembly may include a straight tube adapter that connects to external fluid system components. The assembly may include multiple O-rings providing sealing between various components of the valve body. The O-rings may be constructed from Buna-N material with 70 durometer hardness. The assembly may include compression springs biasing the poppet toward a closed position. The compression springs may be constructed of stainless steel for corrosion resistance. The float assembly may include a float cage with top and bottom caps connected by connecting rods. The connecting rods may be secured to both a top cap and a bottom cap through threaded connections to secure both the top cap and the bottom cap.

According to another aspect of the present disclosure, a fluid system valve assembly is provided. The assembly includes a valve housing defining a flow path between an inlet portion and an outlet portion. A movable valve element is disposed within a valve housing and configured to control fluid flow through the flow path. A float mechanism is responsive to liquid level changes. A mechanical linkage operatively couples a float mechanism to a movable valve element, wherein the mechanical linkage includes a flexible cable connection. A spring system biases the movable valve element toward predetermined positions.

According to other aspects of the present disclosure, the assembly may include one or more of the following features. The flexible cable connection may comprise a wire rope secured with compression sleeves at both ends. The wire rope may have a length selected that is at least six inches long. The spring system may comprise two compression springs constructed of stainless steel material. The float mechanism may include a float cage having a top cap and a bottom cap connected by connecting rods.

According to another aspect of the present disclosure, a float-controlled valve apparatus is provided. The apparatus includes a valve body assembly having fluid inlet and outlet connections. A piston mechanism is movably positioned within the valve body assembly. A valve closure element is configured to engage a sealing surface to regulate fluid flow. A buoyant actuator assembly is responsive to liquid level variations. A wire rope coupling system connects the buoyant actuator assembly to the piston mechanism, wherein vertical displacement of the buoyant actuator assembly causes corresponding movement of the piston mechanism and valve closure element.

According to other aspects of the present disclosure, the apparatus may include one or more of the following features. The wire rope coupling system may include compression sleeves securing the wire rope at connection points. The compression sleeves may be positioned at both ends of the wire rope to provide secure mechanical attachment. The buoyant actuator assembly may include a float cage having a top cap and a bottom cap connected by connecting rods. The apparatus may include a sealing system with multiple O-rings constructed from Buna-N or other thermoplastic elastomeric materials providing fluid-tight seals between components of the valve body assembly.

More specifically, the present disclosure describes a float-actuated fluid valve assembly, comprising: a valve body having an inlet port and an outlet port; a floating piston movably disposed within the valve body; a poppet positioned within the valve body and configured to selectively seal against a poppet valve seat that controls fluid flow between the inlet port and the outlet port; a float assembly operatively connected to the floating piston through a connecting mechanism, wherein the float assembly responds to changes in fluid level that actuates movement of the floating piston, which controls positioning of the poppet relative to the poppet valve seat; and at least one piston closing spring and at least one poppet closing spring that provides compression and release capability of a floating piston actuator area and a floating piston drive area respectively, so that as fluid fills a floating piston chamber the floating piston changes position in order to release the poppet from its poppet valve seat and wherein the floating piston actuator area reduces in fluid volume that reduces the floating piston actuator area that allows the floating piston drive area to increase in fluid volume and allows more fluid to fill the float-actuated fluid valve assembly wherein fluid flows from a fluid holding tank or reservoir into the float-actuated fluid valve assembly and wherein the piston closing spring(s) and the poppet closing spring(s) are positioned to control the floating piston wherein the connecting mechanism extends between the float assembly and the floating piston and wherein fluid is drained from the float-actuated fluid valve assembly and the floating piston chamber when the floating piston actuator area increases in fluid volume and the floating piston drive area decreases in fluid volume to provide cyclic fill and depletion of the float-actuated fluid valve assembly so that the float-actuated valve assembly receives some or no fluid from the fluid holding tank or reservoir.

Here, the float-actuated fluid valve assembly of claim 1, wherein the fluid is a type of fuel and wherein the fuel can be any fuel of any density wherein the connecting mechanism comprises a wire rope, cable, and/or cord that is secured with compression sleeves positioned at both ends of the connecting mechanism.

The compression sleeves are mechanically compressed and create permanent attachment points that resist pullout forces.

The float-actuated fluid valve assembly further comprises a poppet guide directing movement of the poppet within the valve body.

In addition, multiple O-rings providing sealing between various components of the valve body are provided wherein the O-rings are constructed from Buna-N material with 70 durometer hardness and/or other thermoplastic elastomers with variable durometer hardness.

Also required is a compression spring system that is constructed of stainless steel and/or other materials that exhibit corrosion resistance.

The float assembly may include a float cage having a top cap and a bottom cap connected by connecting rods.

The float-actuated fluid valve assembly includes connecting rods are secured to both a top cap and a bottom cap through threaded connections.

In addition threaded connections comprise hex nuts that create threaded engagement with corresponding threaded features on the connecting rods.

In another embodiment, the fluid system valve assembly comprises:
- a valve housing defining a flow path between an inlet portion and an outlet portion;
- a movable valve element disposed within the valve housing and configured to control fluid flow through one or more flow paths;
- a float mechanism responsive to liquid level changes and including a float cage having a top cap and a bottom cap connected by connecting rods;
- a mechanical linkage that operatively couples a float mechanism to a movable valve element, wherein the mechanical linkage includes a flexible cable connection comprising a wire rope, cable, and/or cord secured with compression sleeves at both ends; and
- a compressive spring system comprising two compression springs constructed of stainless steel material or other corrosive resistive materials that bias the movable valve element toward predetermined positions.

Here the wire rope has a length selected that is at least six inches long and the compression sleeves are mechanically compressed to create permanent attachment points that resist pullout forces.

The compression sleeves include internal gripping features that enhance mechanical engagement with wire rope strands and wherein the connecting rods are secured to both the top cap and the bottom cap through threaded connections comprising hex nuts.

In yet another embodiment, the float-controlled valve apparatus also comprises:
- a valve body assembly having fluid inlet and outlet connections;
- a piston mechanism movably positioned within the valve body assembly;
- a valve closure element configured to engage a sealing surface to regulate fluid flow;
- a buoyant actuator assembly responsive to liquid level variations and optionally including a float cage having a top cap and a bottom cap connected by connecting rods;
- a wire rope, cable and/or cord coupling system connecting the buoyant actuator assembly to the piston mechanism, wherein vertical displacement of the buoyant actuator assembly causes corresponding movement of the piston mechanism and valve closure element; and
- a sealing system with multiple O-rings constructed from Buna-N or other thermoplastic materials that provides fluid-tight seals between components of the valve body assembly.

Here the wire rope coupling system includes compression sleeves securing the wire rope at connection points, wherein the compression sleeves are positioned at both ends of the wire rope that provide secure mechanical attachment and wherein the compression sleeves are mechanically compressed to create permanent attachment points that resist pullout forces.

5

Here, the connecting rods are secured to both the top cap and the bottom cap through threaded connections.

In another embodiment, the float-actuated fluid valve assembly, comprises a valve body having an inlet port and an outlet port;

a floating piston movably disposed within the valve body and having a cross-sectional area;

a poppet positioned within the valve body and configured to selectively seal against a poppet valve seat to control fluid flow between sad inlet port and the outlet port, the poppet having a poppet rod extending therefrom;

a poppet guide directing movement of the poppet within the valve body;

a float assembly operatively connected to the floating piston through a wire rope connecting mechanism wherein the float assembly includes a float that is size, weight and cross-sectional area adjustable and a flow restricted pressure balancing channel providing a controlled fluid path for pressure equalization during valve operation, wherein the cross-sectional area of the floating piston is greater than a cross-sectional area of a poppet piston chamber where the poppet operates.

Here the wire rope connecting mechanism comprises a wire rope secured using compression sleeves positioned at both ends of the wire rope wherein the compression sleeves are mechanically compressed to create permanent attachment points that resist pullout forces and the float-actuated fluid valve assembly further comprises a set of compression springs biasing the poppet toward a closed position.

This set of compression springs is constructed of stainless steel or other materials that resist corrosion resistance and also allow for spring constant and force changes as required by various fluid densities.

The float-actuated fluid valve assembly further comprises multiple sealing rings that provide fluid-tight seals between various components of the valve body.

These sealing rings are constructed from Buna-N material and/or other elastomeric thermoplastics with a 70 durometer hardness or in a range of 40-90 durometer hardness or within a range of durometer hardness that allows for adjustment of the float-actuated fluid valve assembly to operate for different fluids with different fluid densities.

A ruggedized version of the float-actuated valve assembly includes a float cage having a top cap and a bottom cap connected by connecting rods that provides a ruggedized version of the float-actuated fluid valve assembly Here, the connecting rods are secured to both the top cap and the bottom cap through threaded connections and further comprises a pilot channel extending through a poppet with a poppet rod that provides controlled fluid flow valve operation(s).

In another embodiment the fluid system valve assembly comprises:

a valve housing defining a flow path between an inlet portion and an outlet portion;

a floating piston disposed within the valve housing and configured to move axially in response to pressure differentials;

a poppet valve element positioned within the valve housing and configured to control fluid flow through a flow path;

a pilot channel extending through a poppet valve element;

a float mechanism responsive to liquid level changes;

a wire rope or other mechanically coupling mechanism to the floating piston; and a flow restricted pressure balancing channel configured such that the flow restricted pressure balancing channel provides controlled fluid communication between chambers within the valve housing and provides an ability for fluid to flow or be stopped as needed to ensure fluid flow regulation.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 2 depicts an isometric view of a float-actuated fluid valve assembly, according to aspects of the present disclosure.

FIG. 3 depicts a side view of the float-actuated fluid valve assembly of FIG. 2, according to aspects of the present disclosure.

FIG. 5 illustrates a front view of the valve assembly with float cage assembly, according to aspects of the present disclosure.

FIG. 6 depicts a detailed cross-sectional view of the valve assembly of FIG. 5, according to aspects of the present disclosure.

FIG. 8 depicts a front view of the float-actuated fluid valve assembly with extended attachment, according to aspects of the present disclosure.

FIG. 9 shows a side view of the float-actuated fluid valve assembly with extended attachment, according to aspects of the present disclosure.

FIG. 14 illustrates three possible arrangements that provide attachments to a fluid tank of the float-actuated fluid valve assembly for trucks providing generators for generating power at remote locations according to aspects of the present disclosure.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
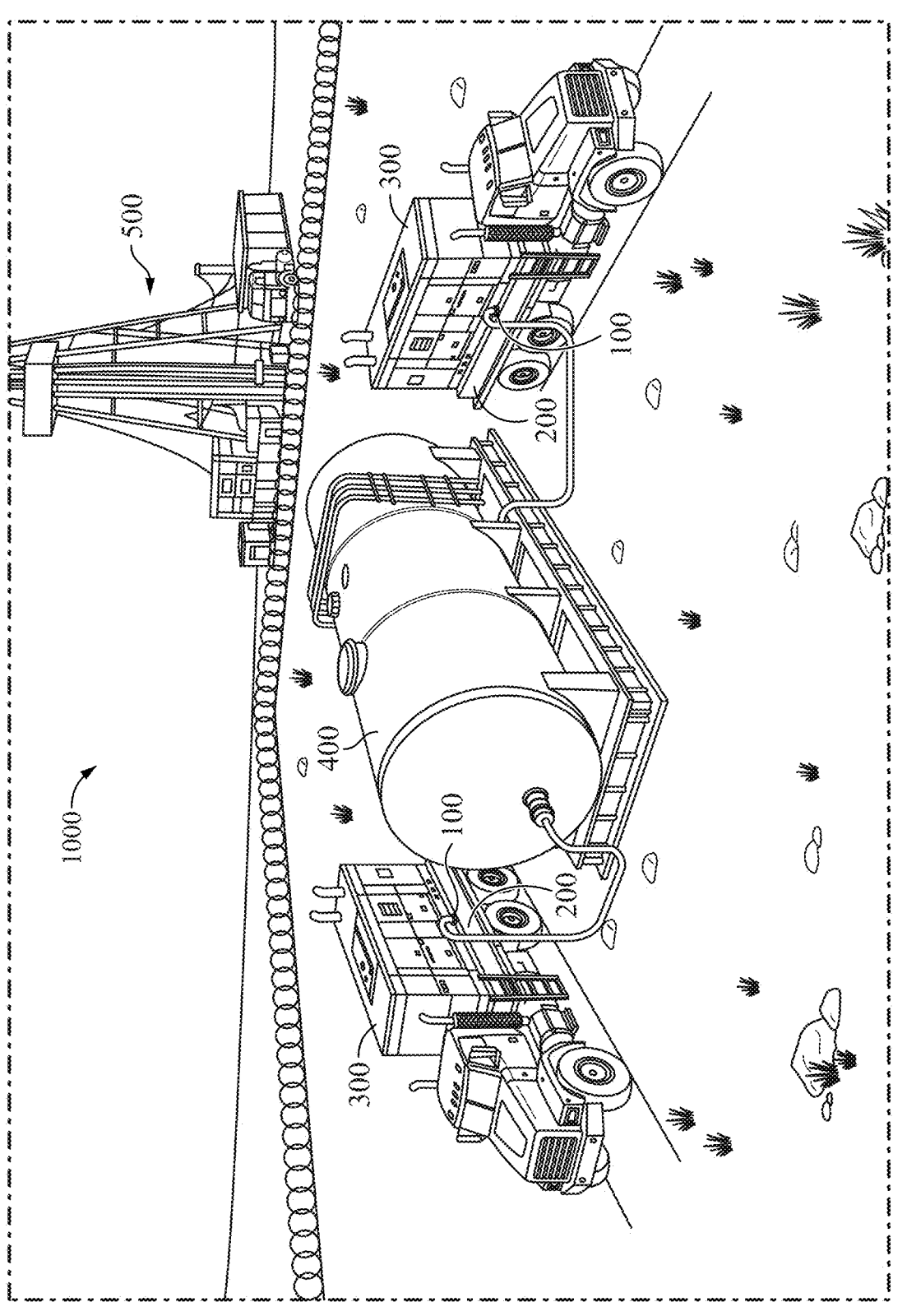
FIG. 1 illustrates a schematic view illustrating the utility of the flow actuated fluid control valve system in use at a petrochemical well site.

The float-actuated fluid valve assembly [100] represents a sophisticated fluid control system designed to regulate fluid flow based on liquid level variations within a fluid tank [200] or reservoir. The valve assembly [100] incorporates multiple interconnected components that work in coordination to provide automated valve operation responsive to changing fluid conditions. Referring to the system [1000] of FIG. 1, the float-actuated fluid valve assembly [100] is attached to the fluid tank [200] of a vehicle [300] allowing for continuous delivery of fluid from a fluid storage tank [400] in order to maintain an operational level of fluid within the fluid tank [200]. A continuous fluid feed is therefore provided without the need for monitoring of the fluidizing, allowing the fluid level within the fluid tank [200] of the vehicle [300] to be maintained with an operating level of fluid at all times, which is used, in this embodiment, to power "on vehicle" generators used to supply power to a drilling rig [500].

As shown in FIG. 2, the float-actuated fluid valve assembly [100], in a highly durable, ruggedized, constrained or "caged" configuration [100A], incorporates a valve body [101] and valve body cap [103] to form a complete housing structure, where the valve body [101] forms the central housing structure that contains and supports the various internal components of the assembly.

The primary structural elements, shown in FIG. 2, of the ruggedized caged valve assembly [100A] includes a valve body [101] housing, a fluid cap thread adapter [114], a thread adapter [119], straight tubing [120], connected by hose clamps [129] to a fluid flow hose [121], and a float [127], connected to a float cage top cap [124] and a float cage bottom cap [128] using connecting rods [125] and hex nuts [126], that serves as the actuating component for the entire system. The fluid enters the valve body [101] through a hydraulic quick-disconnect nipple [118], fitted with a threaded nipple [117] to a pipe fitting adapter [115]. A side view of the entire completed assembly is also provided in FIG. 3 with the same numbering annotation.

The float-actuated fluid valve assembly [100] functions as a fluid system valve assembly that utilizes buoyancy-based sensing to achieve automatic flow control without external power sources or electronic control systems. In many cases, the fluid is a fuel but could also be a liquid, a compressed gas in fluid form such as liquid nitrogen or carbon dioxide, or even a room temperature gas system that dispenses, for example, nitrogen in a complete gaseous form.

Figure 4:
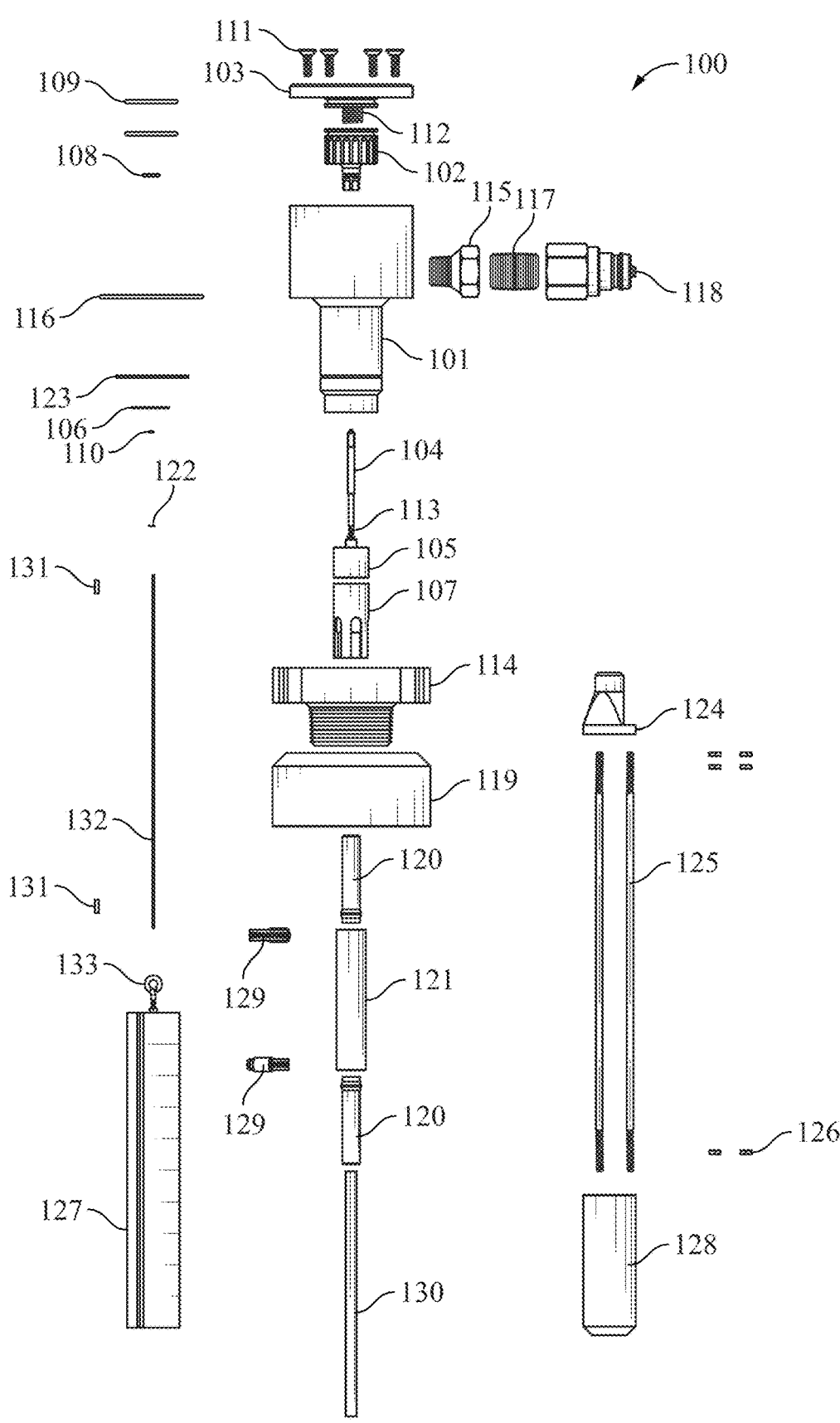
FIG. 4 shows an exploded view of the float-actuated fluid valve assembly, according to aspects of the present disclosure.

The exploded view of FIG. 4 illustrates the components of the float-actuated fluid valve assembly [100]. Within the valve body [101], a floating piston [102] mechanism may be positioned to translate mechanical motion from the float [127] into valve actuation forces. The floating piston [102] may be configured to move axially within the valve body [101] in response to positional changes of the float [127], engaging the piston closing spring [112], thereby providing the mechanical linkage between fluid level sensing and valve control functions. The compression spring force (K value) and the float [127] can be adjusted as needed to compensate for different fluid densities. The fluid densities must be accommodated to ensure the system functions as intended. This adjustability of the float-actuated fluid valve assembly [100] is a critical feature of the present disclosure. The floating piston [102] is sealed within the valve body [101] through appropriate sealing elements, such as O-rings (particularly O-ring A [108] and O-ring B [109]) and screws [111] used to secure the valve body cap [103], to prevent fluid leakage while allowing smooth operational movement.

The valve body cap [103] arrangement completes the structural assembly by providing closure and support for the internal valve assembly [100] components. A valve body cap [103] is secured to the main valve body [101] through alternative threaded connections, bolted flanges, or other mechanical fastening methods that create a pressure-tight seal while allowing access for maintenance or component replacement. In some cases, the valve body cap [103] incorporate additional sealing elements and provides mounting points for external components such as actuating mechanisms or sensing devices. The valve body cap [103] may also include provisions for pressure relief or venting to prevent over-pressurization of internal chambers during valve assembly [100] operation or thermal expansion of trapped fluids.

The sealing system incorporated within the float-actuated fluid valve assembly [100] may utilize multiple O-ring configurations to maintain fluid-tight seals at various interface points throughout the valve assembly [100]. The O-rings [108, 109, 110, 116] are constructed from Buna-N material and/or other suitable thermoplastic elastomers which may provide chemical resistance and durability when exposed to fluids including petroleum-based fluids. The Buna-N material is usually formulated with a 70 durometer hardness rating, which provides an optimal balance between sealing effectiveness and compression characteristics under the operating pressures and temperatures encountered in fluid system applications. The sealing system incorporates O-rings of multiple distinct sizes that accommodate different sealing requirements at various locations within the valve assembly [100].

Fluid from the fluid storage tank [400] (shown in FIG. 1) enters the valve body [101] through a hydraulic quick disconnect nipple [118], fitted with a threaded nipple [117] to a pipe fitting adapter [115].

Figure 12:
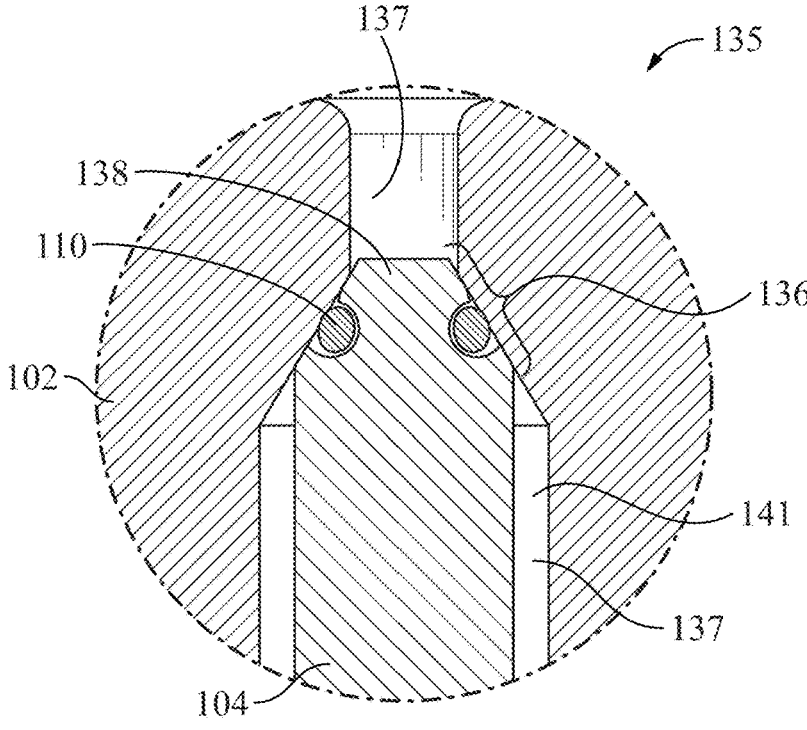
FIG. 12 depicts a detailed cross-sectional view of a poppet valve, according to aspects of the present disclosure.

The poppet valve element [104], or poppet, is incorporated within the valve body [101] to provide the primary flow control function for the fluid system. The poppet [104], fitted with a sealing O-ring, specifically O-Ring C [110], is designed to engage with a poppet valve seat (shown in detail in FIG. 12) to create a sealed closure when in the closed position, and to allow fluid flow when moved to an open position. In some cases, the poppet [104] is spring-loaded, using a poppet closing spring [113], to provide a bias force toward either the open or closed position, depending on the specific operational requirements of the system [1000]. The poppet design allows for precise flow control and reliable sealing performance under varying pressure and temperature conditions.

The poppet [104] is positioned within a poppet guide [105], which guides the poppet [104] within the valve body [101] while also providing support to the poppet [104]. A straight tube adapter [107] is positioned below the poppet guide [105], creating a transition to a straight tube [120]

through fluid cap thread adapter [114] and the thread adapter [119], which are needed for attachment to the current fluid tank [200] opening.

The threaded adapter [119] system incorporated within the float-actuated fluid valve assembly [100] provide versatile connection capabilities that enable integration with various fluid system components and existing infrastructure. With continued reference to FIG. 4, a straight tube adapter [107] may incorporate National Pipe Thread (NPT) configurations in multiple size and gender combinations to accommodate different connection requirements encountered in fluid handling applications. The fluid cap thread adapter [114] is normally manufactured from materials that provide appropriate strength and corrosion resistance when exposed to fluid vapors and other environmental conditions typical of fluid system installations. A quick disconnect nipple which is also a hydraulic quick disconnect nipple [118] is often positioned to facilitate rapid connection and disconnection of fluid handling equipment, providing operational convenience and system flexibility during fluid transfer operations.

The fluid flow hose [121] is attached to the straight tube [120] using the hose clamp [129] and an internal retaining ring [106]. The top of the fluid cap thread adapter [114] is sealed to the valve body [101] using an O-ring, specifically O-Ring D [116], while the bottom of the fluid cap thread adapter [114] is retained with the valve body [101] using an external retaining ring [123], preferably made from stainless steel.

The straight tube [120] entering the tank is attached by a hose clamp [129] to a fluid flow hose [121], which is attached to another straight tube [120] by a hose clamp [129]. Chemical resistant tubing [130] is housed within the fluid flow hose [121].

A wire rope [132], which runs through the chemical resistant tubing [130] and is fitted at each end with a compression sleeve [131], is attached at the top of float and the bottom of the poppet [104] and at the top the float [127] using an eyehook [133]. The float [127] is housed within a float cage (shown completed in FIG. 5) constructed from a float cage top cap [124] and float cage bottom cap [128], where connecting rods [125] are used to cage the float [127]. The connecting rods [125] are attached to the float caps [124, 128] using hex nuts [126] or other suitable fasteners.

The float-actuated fluid valve assembly [100], shown from a front view in FIG. 5, serves as the primary sensing element that responds to fluid level changes within the tank [200] or reservoir. The float [127], housed within a float cage [134], is connected to the floating piston [102] mechanism through a mechanical linkage system that translates the vertical movement of the float [127] into corresponding movement of the floating piston [102] and poppet [104] elements. As fluid levels rise or fall, the buoyant force acting on the float [127] causes corresponding positional changes that are transmitted through the linkage system to actuate the valve assembly [100]. With continued reference to FIG. 5, this arrangement provides automatic valve control that makes the valve assembly [100] suitable for use in remote or hazardous environments where electrical systems may not be practical or safe. The mechanical nature of the actuation system eliminates the need for external power sources while providing reliable operation across a wide range of operating conditions.

The float cage assembly [134] utilizes a split construction approach that divides the protective cage structure into separate upper and lower sections. As shown in FIG. 5, a float cage [134] facilitates assembly and maintenance operations while providing structural integrity and protection for the internal float components. The separate cage sections [124, 125, 126, 128] are designed to align precisely with each other during assembly, creating a continuous protective enclosure around the buoyant elements. In some cases, the split cage design may allow for easier replacement of internal float components without requiring complete disassembly of the valve assembly [100] system, reducing maintenance time and complexity. The float cage [134] may include a float cage top cap [124] and a float cage bottom cap [128] connected by connecting rods [125], with the connecting rods [125] secured to both the float cage top cap [124] and the float cage bottom cap [128] through threaded connections, such as hex nuts [126], to secure both the float cage top cap [124] and the float cage bottom cap [128].

The float [127] is constructed as a multi-component system designed to provide reliable buoyancy-based sensing and actuation for the valve assembly [100] mechanism. As further shown in FIG. 5, a float [127] incorporates a cage-based design that protects the buoyant elements while allowing free movement in response to changing fluid levels within the tank [200] or reservoir. The float [127] is configured to maintain proper orientation and positioning of the float [127] components during operation, preventing rotation or tilting that could interfere with the mechanical linkage to the valve assembly [100] actuating system. In some cases, the float [127] may be designed to operate effectively across a wide range of fluid densities and viscosities, ensuring consistent performance regardless of fluid type or temperature variations. The float [127] may be modified according to the density of the fluid being fed into the tanks [200] to accommodate different fluid types.

The structural framework of the float [127] may utilize connecting elements to maintain proper component alignment and spacing. Referring to FIG. 5, a connecting rod [125] provides the structural framework that links various float cage [134] components into a unified assembly. The connecting rod [125] may be positioned at multiple locations around the circumference of the float cage [134] structure, creating a distributed support system that maintains proper spacing and alignment between upper and lower cap components [124, 128]. In some cases, three connecting rods [125] may be utilized to provide stable three-point support that prevents rotation or tilting of the float cage [134] assembly during operation. The connecting rod [125] is constructed from corrosion-resistant materials that can withstand long-term exposure to fluid and fluid vapors without degradation or loss of structural integrity.

FIG. 6. provides a cross-sectional view of the caged float-actuated fluid valve assembly [100] where the valve body [101] serve as the primary structural housing that contains and coordinates the operation of multiple internal components to achieve precise fluid flow control. The valve body [101] is constructed with internal chambers and passages that accommodate the movement of various valve elements while maintaining proper sealing and alignment during operation. In some cases, the valve body [101] includes machined surfaces and bearing areas that support the reciprocating motion of internal components while preventing binding or misalignment that could compromise valve performance. As further shown in FIG. 6, the valve body [101] incorporates inlet and outlet ports that connect to external piping systems, with internal flow passages designed to direct fluid through the valve mechanism in a controlled manner.

Figure 7:
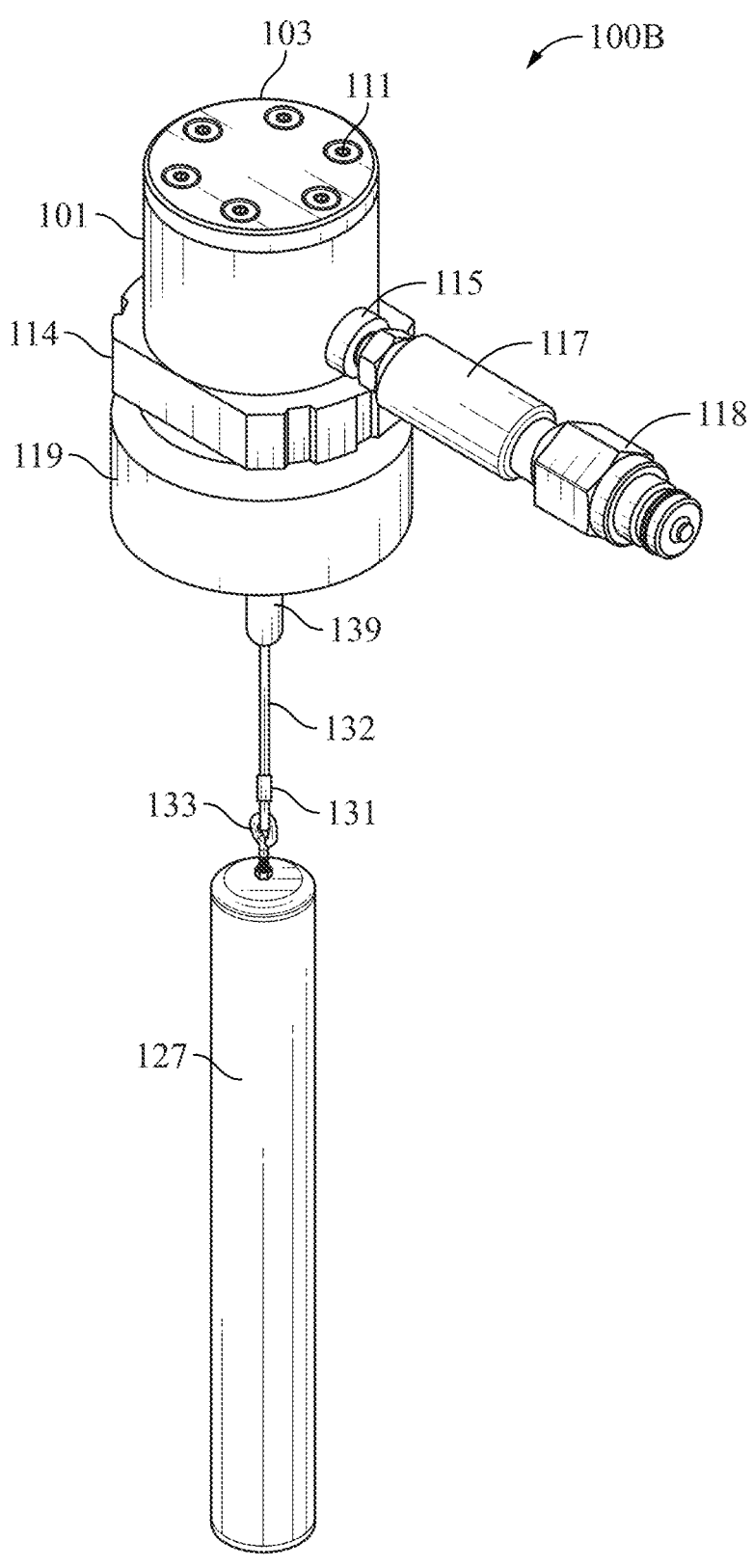
FIG. 7 illustrates an isometric view of the float-actuated fluid valve assembly, according to aspects of the present disclosure.
Figure 11:
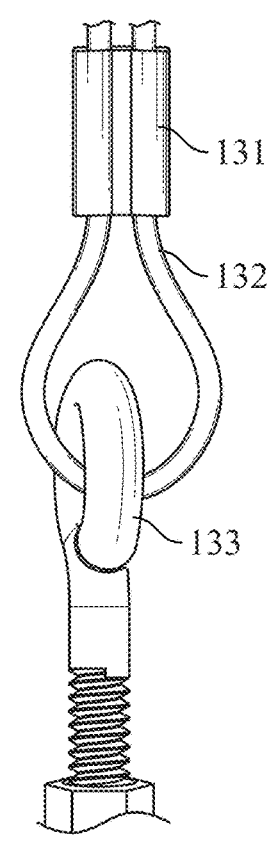
FIG. 11 shows a side view of a wire rope connection component, according to aspects of the present disclosure.

FIG. 7 illustrates a top isometric view of the free-floating, uncaged float-actuated fluid valve assembly [100B], showing the uncaged float [127] attached via eyehook [133] to the wire rope [132], which when connected, inside the valve body [101], using a wire guide extender [139], to the poppet [104] allows the actuation of the uncaged valve assembly [100B] based on movement of the floating piston [102] in relation to the fluid level within a fluid tank [200]. FIG. 11 provides a close-up view of the connection of the eyehook [133] connection to the wire rope [132], where wire rope [132] is looped and held in place using a compression sleeve [131].

The wire rope [132] securing system incorporates compression sleeve [131] elements that provide reliable mechanical attachment points at both ends of the wire rope [132] assembly. As shown in FIG. 11, a compression sleeve [131] is positioned over the wire rope [132] ends and mechanically compressed or crimped to create permanent attachment points that resist pullout forces and maintain secure connections throughout the operational life of the valve assembly [100]. In some cases, the compression sleeve [131] is manufactured from materials that provide appropriate strength characteristics and corrosion resistance when exposed to fluid system environments. The compression sleeve [131] design is crimped and incorporates internal gripping features or surface textures that enhance the mechanical engagement with the wire rope [132] strands, preventing slippage or gradual loosening under repeated loading cycles.

The mechanical linkage between the float [127] and the valve assembly [100] actuating mechanism is achieved through a wire rope [132] connecting system that provides flexible yet reliable transmission of float [127] movement to the floating piston [102] and valve assembly [100] components. Referring to FIG. 7, a wire rope [132] serves as the primary mechanical coupling that translates the vertical displacement of the float [127] into corresponding actuation forces within the valve body [101], enabling the buoyancy-based sensing function to control fluid flow through the valve assembly [100] mechanism. In some cases, the wire rope [132] configuration may be selected to provide appropriate mechanical advantage and response characteristics while accommodating the physical constraints and installation requirements of the fluid tank [200] environment. An additional wire rope [132] may be incorporated to provide enhanced mechanical coupling or redundant connection capability within the valve assembly [100].

An extended attachment arrangement for a fluid delivery hose (not shown) is provided for fluid from the fluid storage tank [400] (not shown) to enter the valve body [101] through a hydraulic quick disconnect nipple [118], fitted with an extended version of the threaded nipple [117] with or without a filter—the filter would be between the quick disconnect threaded nipple [118] and the valve body [101] to a pipe fitting adapter [115]. FIG. 8 provides a front view of the free-floating uncaged float-actuated fluid valve assembly [100B] of FIG. 7. FIG. 9 provides a side view of the free-floating uncaged float-actuated fluid valve assembly [100B] of FIG. 7.

Figure 10:
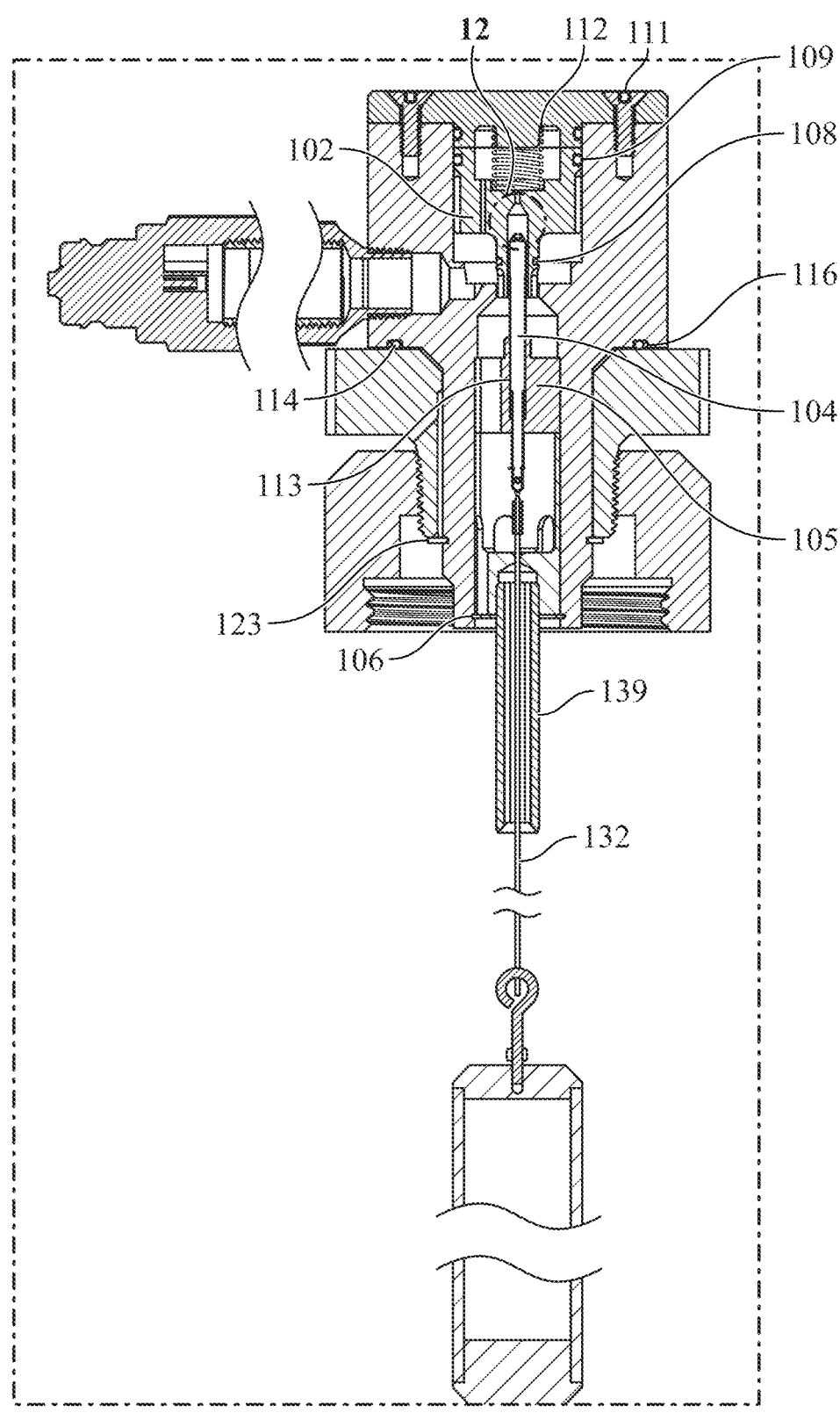
FIG. 10 illustrates a cross-sectional view of the actual valve assembly showing internal components, according to aspects of the present disclosure.

Within the valve body [101], a floating piston [102] mechanism is positioned to provide the primary actuating force for the valve assembly [100]. Referring to FIG. 10, a cross-sectional view of the free-floating uncaged float-actuated fluid valve assembly [100B] of FIG. 7, a floating piston [102] may be configured as a cylindrical component that moves axially within a corresponding bore or chamber in the valve body [101], with the floating piston [102] movement directly controlling the opening and closing of the valve assembly [100]. In some cases, the floating piston [102] may include sealing elements such as O-rings [108, 109] or gaskets that maintain a fluid-tight seal between the floating piston [102] and the valve body [101] while allowing smooth sliding motion during operation. The floating piston [102] may be connected to external actuating mechanisms through mechanical linkages that translate external forces into the linear motion needed for valve assembly [100] control. An internal retaining ring [122] is positioned to secure the floating piston [102] within the valve body [101] while allowing controlled axial movement during valve assembly [100] operation.

The poppet valve [135] arrangement works in conjunction with the floating piston [102] to provide the actual flow control function within the valve assembly [100]. As shown in FIG. 10, and further detailed in FIG. 12, a poppet [104] is designed as a movable valve element that engages with a poppet valve seat [136] to create a sealed closure when in the closed position, effectively blocking fluid flow through the valve. When the poppet [104] moves away from the poppet valve seat [136], fluid may flow through the valve assembly [100] from an inlet port to an outlet port, where the inlet port is situated between a fluid storage portion and the outlet port is connected to a fluid tank and the fluid flow is directed through a poppet valve flow channel [137]. The fluid flows through the poppet valve [135]. In some cases, the poppet [104] may be spring-loaded or weighted or possibly magnets, using a poppet closing spring [113] to provide a bias force that maintains the poppet valve [135] in either a normally open or normally closed configuration, depending on the specific application requirements and safety considerations of the system. The poppet [104] design allows for precise flow control and reliable sealing performance under varying pressure and temperature conditions.

A separate poppet guide [105] component is integrated within the valve body [101] to control and direct the movement of the poppet [104] during valve operation. With continued reference to FIG. 10, the poppet guide [105] provides structural support and precise alignment for the poppet [104] as the poppet [104] moves between open and closed positions within a poppet piston chamber [141], ensuring consistent sealing performance and preventing lateral movement that could cause premature wear or leakage. In some cases, the poppet guide [105] may include machined surfaces or bearing areas that allow smooth sliding motion of the poppet [104] while maintaining proper concentricity with the valve seat. The poppet guide [105] may also serve to limit the travel distance of the poppet [104], preventing over-travel that could damage sealing surfaces or cause excessive stress on valve components. A retaining ring [106] may secure the poppet guide [105] within the valve body [101] while maintaining proper positioning during assembly and operation.

The spring system incorporated within the float-actuated fluid valve assembly [100] may utilize a set of dual closing springs [112, 113] configurations to provide controlled biasing forces for proper valve assembly [100] operation. As shown in FIG. 10, a closing spring [112, 113] may include two distinct compression spring elements, each designed with specific force characteristics and dimensional properties to achieve optimal valve performance under varying operating conditions. Both closing springs [112, 113] may be manufactured from 302 stainless steel or other suitable materials as required based on the density or input pressure associated with various fluids which may provide corrosion resistance and mechanical durability when exposed to fluid vapors and other environmental conditions encountered in fluid system applications. The piston closing spring [112] is positioned within the valve assembly [100] to provide a primary biasing force for one or more valve components, with specific spring rate and force characteristics, wire diameter, coil diameter, and free length dimensions that determine the force-deflection relationship during valve assembly [100] operation.

The floating piston [102] arrangement provides enhanced control characteristics for the valve assembly operation. With continued reference to FIG. 10 and FIG. 12, a floating piston [102] is positioned within the valve body [101] to create pressure balancing and flow control functions during valve assembly [100] operation. The floating piston [102] is configured with a cross sectional area that may be much greater than a poppet piston chamber volume where a poppet [104] operates, allowing for enhanced sensitivity and control response during fluid level changes. A piston closing spring [112] is positioned to support and guide the floating piston [102] during its operational movement within the valve assembly [100]. The system includes both a larger piston closing spring [112] located above the floating piston [102] and a smaller set of poppet closing springs [113] that assist in forcing complete seating of a poppet tip [138] into a poppet valve seat [136]. These smaller set of poppet closing springs [113] are also adjustable as needed based on force and spring constant needs which can help compensate for fluid density changes along with both the float [127] and the larger piston closing spring [112]. In all cases, the springs [112, 113] can be a set of springs configured to further provide adjustments in the float-activated fluid valve assembly as needed.

The system incorporates specialized mounting and positioning of fluid tank elements to secure valve assembly [100] components in their operational positions. As shown in FIG. 14, multiple vehicles [300] provide secure attachments for various fluid tank [200] configurations while allowing controlled movement during the float actuated fluid valve assembly [100] operation. The float-actuated valve assembly [100] is designed to accommodate thermal expansion and operational stresses while maintaining proper component positioning throughout the service life of the valve assembly. Additional float [127] and float assembly configurations are incorporated to provide enhanced buoyancy characteristics or specialized operational features for specific application requirements.

The system includes enhanced monitoring and filtration capabilities to provide comprehensive fluid system management. The system includes a sight glass on the side of the tank for tank fluid level monitoring and a siphon with a sight glass and fluid filter. The sight glass arrangement provides visual indication of fluid levels and system status, while the siphon and filter components enhances fluid quality and system reliability. These monitoring and filtration elements integrate with the valve assembly to provide a complete fluid management solution that addresses both flow control and fluid quality requirements.

The flow control system incorporate multiple flow channels to direct fluid movement through the valve assembly. As further shown in FIG. 10, a flow channel extends through the valve assembly [100] to provide primary fluid passage, while additional flow channel configurations direct fluid to specific areas within the valve assembly [100]. A poppet valve flow channel [137] allows controlled fluid flow through the assembly, providing pressure balancing and flow regulation functions during valve operation. The poppet [104] extends through the center of the assembly, with the poppet [104] positioned to interface with sealing surfaces and flow control elements throughout the valve body [101].

The internal structure of the valve assembly [100] incorporates multiple chambers and flow passages to achieve sophisticated flow control characteristics. As further shown in FIG. 13A the valve body [101] includes machined chambers that accommodate the floating piston [102] and associated closing spring elements [112,113], with the floating piston chamber [170] having a cross sectional area that may be much greater than the poppet piston chamber [141] volume where the poppet [104] operates. The internal geometry may be designed to provide optimal pressure balancing and flow characteristics while maintaining compact overall dimensions for the valve assembly [100]. The valve body [101] may incorporate threaded connections at both upper and lower portions for system integration, with multiple sealing interfaces positioned throughout the assembly to prevent fluid leakage.

The valve assembly [100] incorporates advanced flow control features that enable precise regulation of fluid flow based on system conditions. Referring to FIG. 10, the assembly includes flow restricted pressure balancing channels [160] that provide controlled fluid communication between different chambers within the valve body [101]. These channels allow for pressure equalization and controlled flow rates during valve assembly [100] operation, contributing to stable and predictable valve response characteristics. The internal flow passages are machined to precise dimensions that optimize flow characteristics while minimizing pressure losses through the valve assembly [100].

The operational sequence of the float-actuated fluid valve assembly [100] begins with the float responding to changes in fluid level within the tank [200] or reservoir. As fluid levels rise, the buoyant force acting on the float [127] causes vertical displacement that is transmitted through the mechanical linkage system to actuate the valve assembly [100] components. The mechanical linkage operatively couples the float [127] to the movable poppet [104] valve element through a flexible cable, such as wire rope [132], connection that accommodates the physical constraints and installation requirements of the fluid tank environment. In some cases, the vertical displacement of the float [127] causes corresponding movement of the floating piston [102] mechanism and the valve closure element, poppet [104], creating a direct relationship between fluid level changes and poppet [104] positioning.

Figure 13A:
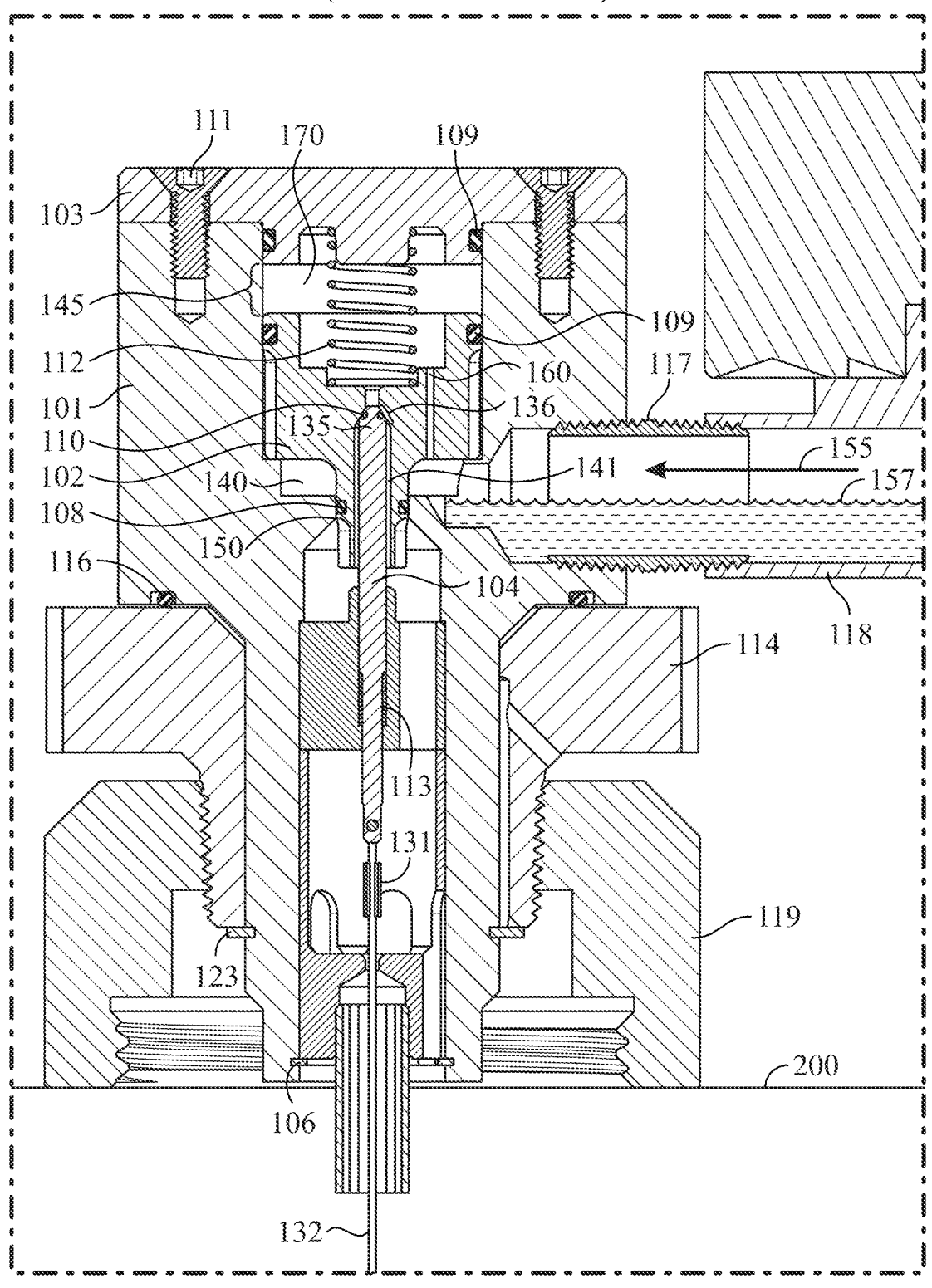
FIG. 13A depicts a cross-sectional view of the valve assembly showing internal component arrangement of an initial position during operation, according to aspects of the present disclosure.
Figure 13B:
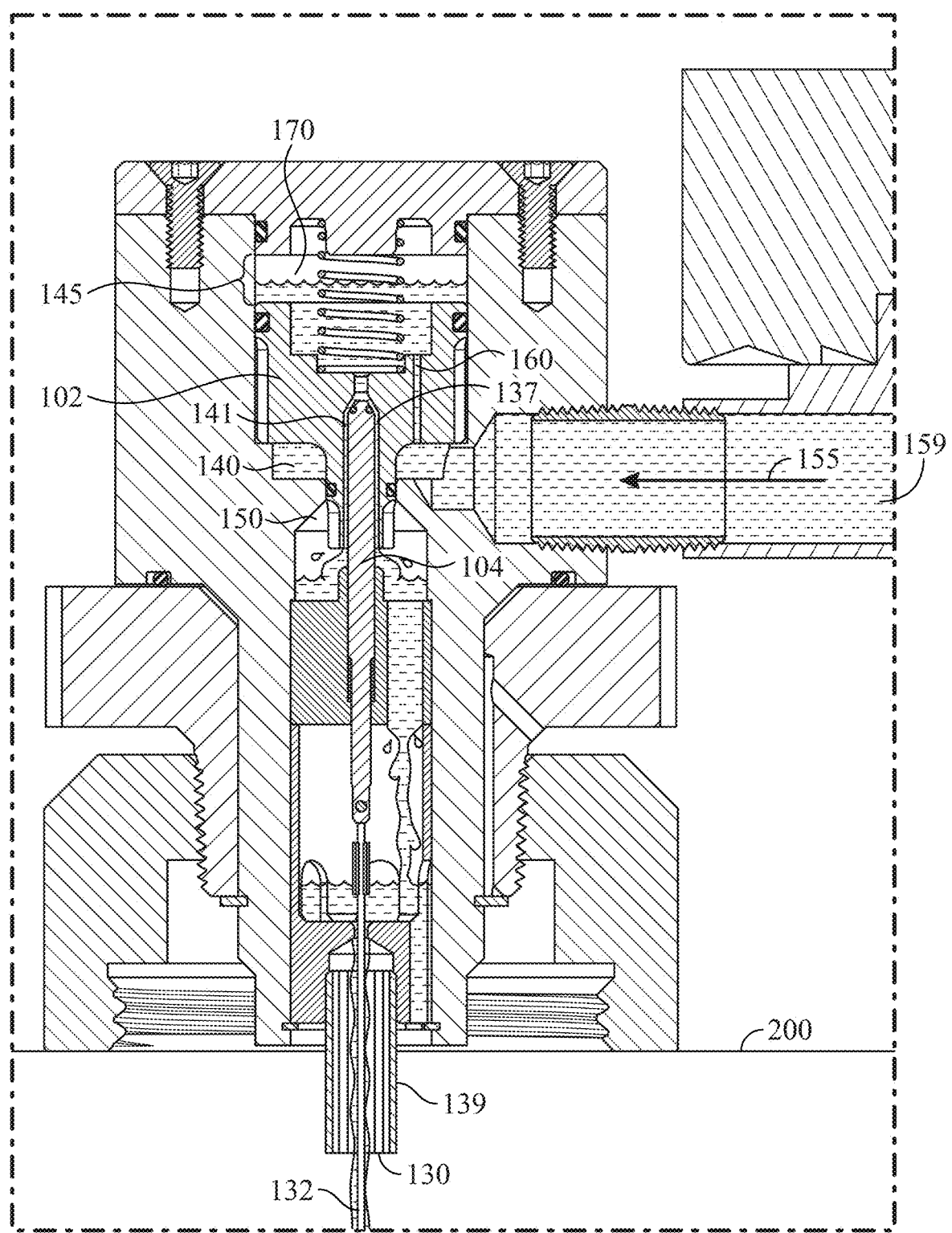
FIG. 13B depicts a cross-sectional view of the valve assembly showing internal component arrangement of a starting to open position during operation, according to aspects of the present disclosure.
Figure 13C:
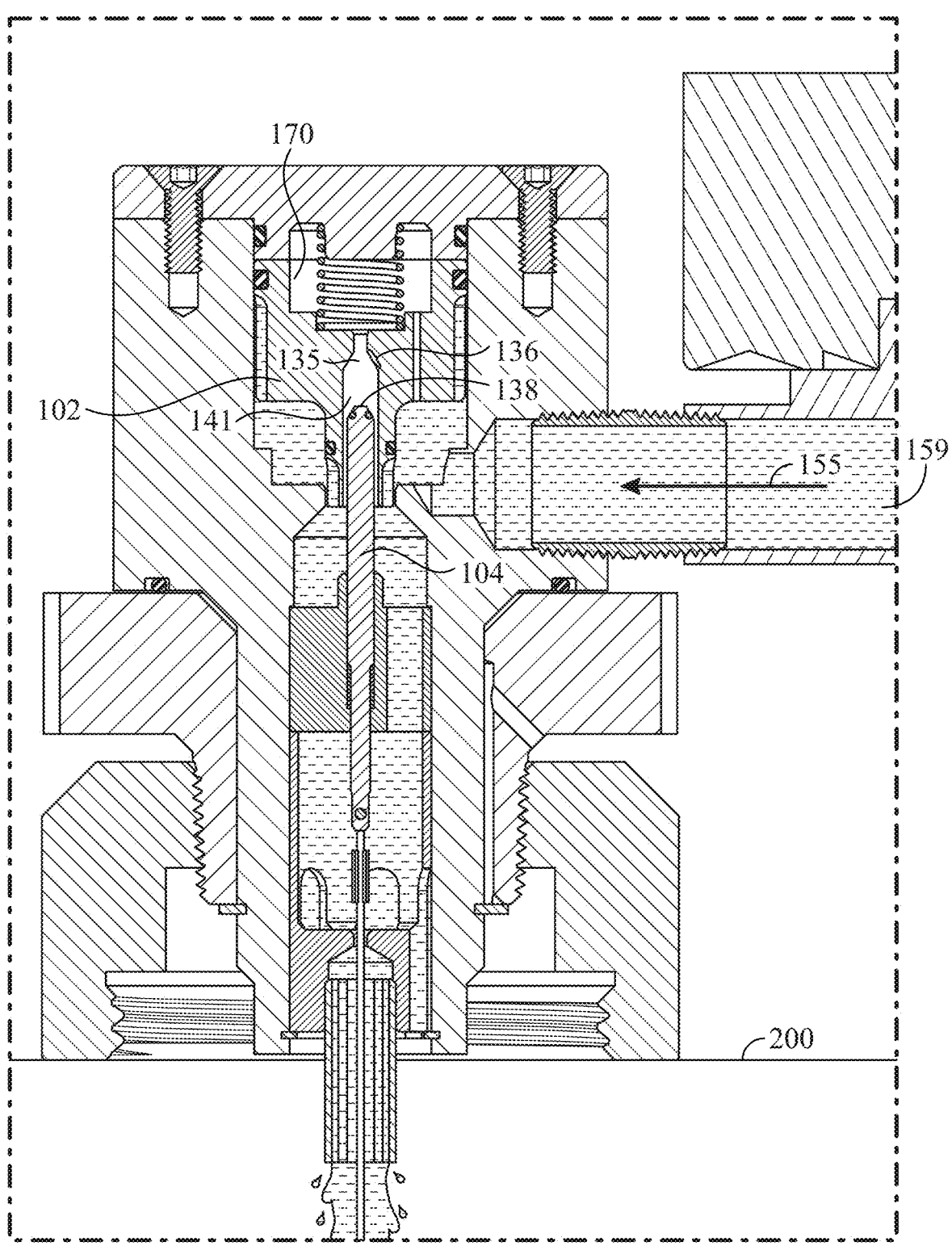
FIG. 13C depicts a cross-sectional view of the valve assembly showing internal component arrangement of an open position during operation, according to aspects of the present disclosure.
Figure 13D:
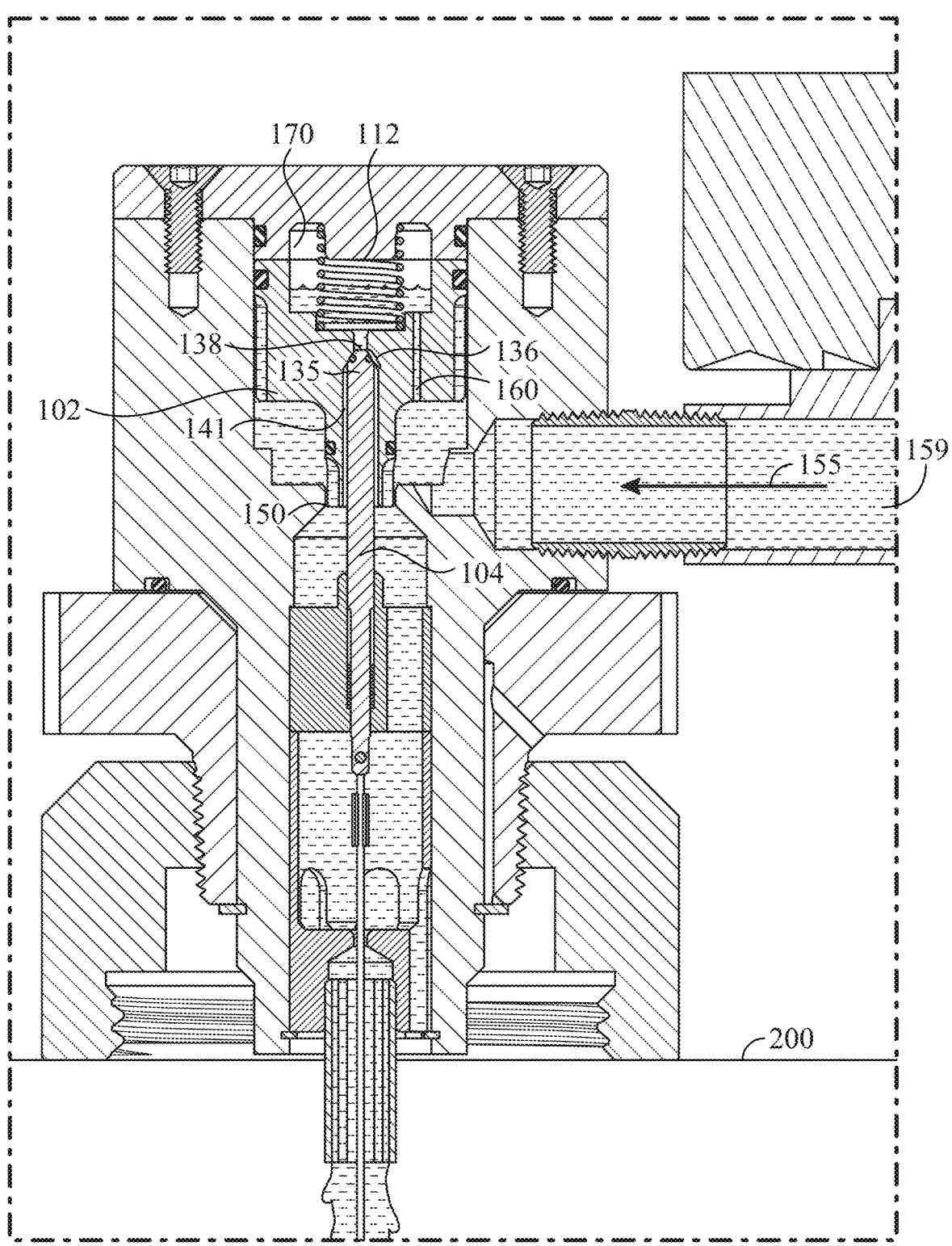
FIG. 13D depicts a cross-sectional view of the valve assembly showing internal component arrangement of a starting to close position during operation, according to aspects of the present disclosure.
Figure 13E:
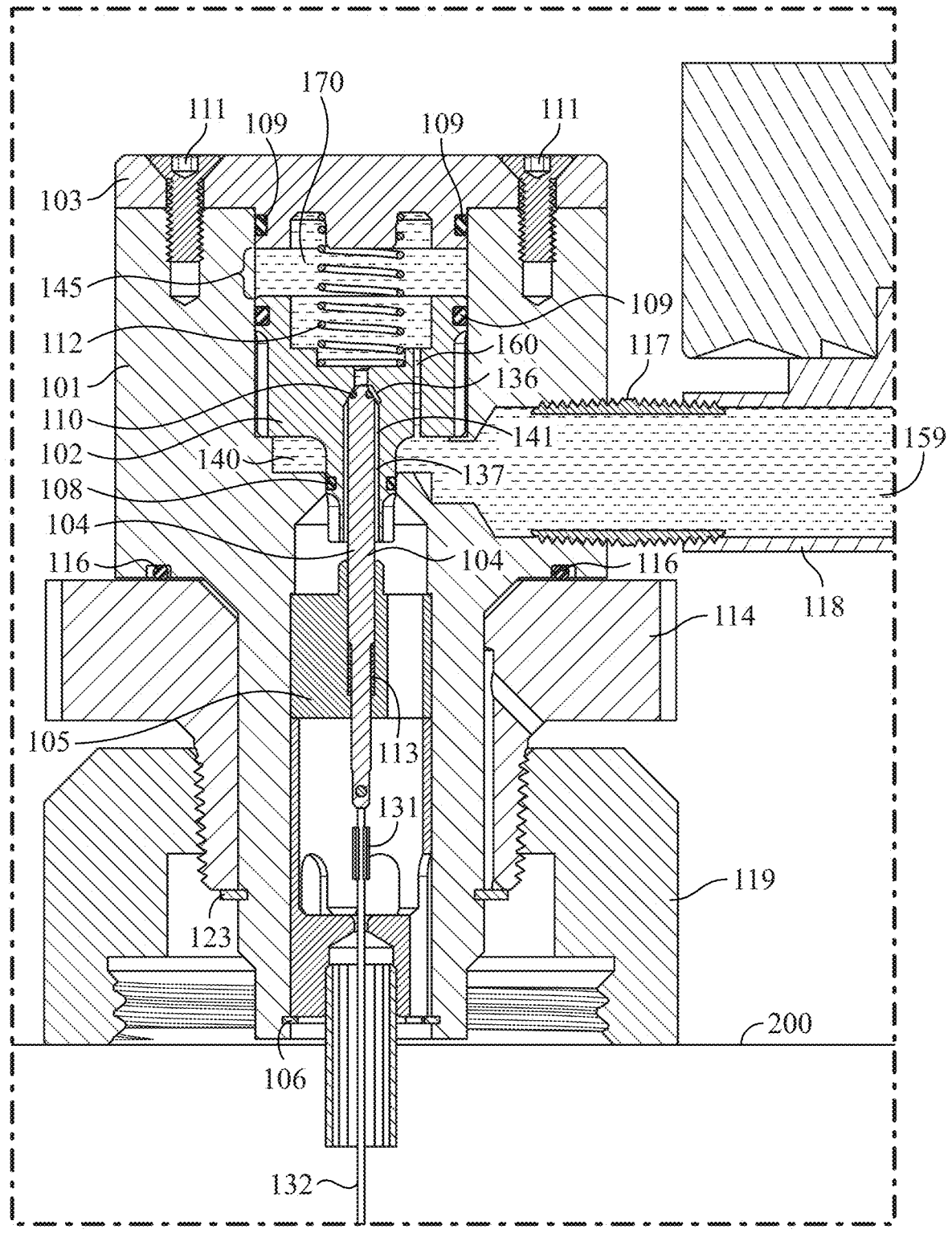
FIG. 13E depicts a cross-sectional view of the valve assembly showing internal component arrangement of a closed position during operation, according to aspects of the present disclosure.

The float [127] responds to changes in fluid level to actuate movement of the floating piston [102], which may control positioning of the poppet [104] relative to the poppet valve seat [136] through a series of interconnected mechanical actions. Referring to FIG. 13A, the fuel tank full initial position that provides for the initial phase of operation occurs when the floating piston chamber [170] provides for a floating piston [102] that allows for changing the volume of the floating piston chamber [170] which houses the piston closing spring [112] with two flow paths that include an operational flow restricted pressure balancing channel [160] and poppet valve [135] allowing for adding and removing fluid from the floating piston chamber [170] that has two portions with different diameters, the bottom portion is a floating piston drive area [140] that provides the basis for movement of the moveable floating piston [102] due to sealing by a sliding sealing device (typically an O-ring [109] with a top portion that is the main valve [150] also with a sealing device typically an O-ring—[108] and a poppet valve [135] and a third portion that is a floating piston actuator area [145] as partially shown in FIG. 12 that consists of an inlet that is the flow restricted pressure balancing channel [160] and an outlet that is the poppet valve flow channel [137] with a poppet valve seat [136] portion and seals which are O-rings [110] and an actuator that is the poppet [104]. Here the system is at or near atmospheric pressure with zero psi gauge inlet pressure when the fueling tank is full such that the inlet flow path [155] with fuel at atmospheric pressure [157] is heading toward the main valve [150]. During this phase, the poppet [104] remains in a seated position with the poppet [104] and poppet tip [138] maintaining an upward vertical sealed position. The float [127] (not shown) is floating on the fuel and not applying any tension through a compression sleeve [131] that is crimped and attached to the poppet [104] which is attached to the wire rope [132] such that the float [127] is completely buoyant and applies no downward force on the poppet [104], which allows for the poppet closing spring [113] to continue holding the poppet [104] closed. The floating piston [102] here remains in a closed position that keeps the main valve [150] closed because there is only atmospheric pressure on both areas of the floating piston chamber [170], the floating piston actuator area [145] and the floating piston drive area [140]. The two areas [140, 145] are equally at atmospheric pressure because the pressure balancing floating piston chamber [170] allows the pressure in the two areas [140,145] to equilibrate. The piston closing spring [112] pushes the floating piston [102] downwards closing the main valve [150].

The cross-sectional area of the floating piston [102] has a volume that is much greater than the poppet piston chamber [141] cross sectional area where the poppet [104] operates in the presence of fluid that fills and empties from the tank [200].

For FIG. 13 B, the starting to open position, the flow restricted pressure balancing channel [160] provides a path for fluid to drain through or fill up as needed during operation to control the movement of the floating piston [102] during filling and emptying of the fluid tank [200]. In the starting to open position the following conditions occur-first, the fluid supply pressure increases which supplies fluid into the lower section of the floating piston chamber [170], the floating piston drive area [140], and goes through the flow restricted pressure balancing channel [160] and equalizes the pressure on the two sides of the floating piston [102] so that there is no net force on the floating piston [102]. The floating piston [102] remains closed and thus the main valve [150] remains closed until the fluid level in the tank [200] is being consumed and the fluid level is decreasing so that the float [127] (not shown) is also moving downward which begins applying tension to the wire rope [132]. As fluid enters the tank [200] through the inlet flow path [155] with fuel under increased gauge pressure [159] heading toward the main valve [150], the poppet valve [135] begins opening by removing from the poppet valve seat [136], the floating piston [102] may move upward while fluid flows through the poppet valve flow channel [137]. The flow restricted pressure balancing channel [160] provides the ability to control the movement of the floating piston [102] during filling as well as during emptying of the fluid tank [200] itself. In some cases, the flow restricted pressure balancing channel [160] provides a balanced poppet [104] and poppet tip [138] of the fluid flow through the poppet valve [135], with the leaking of the fluid flow past the poppet valve [135] becoming greater than the flow through the flow restricted pressure balancing channel [160].

The poppet valve [135] operates with initial dripping of fluid that becomes greater than the flow through the flow restricted pressure balancing channel [160] as pressure differentials change throughout the operational cycle. As this occurs, the pressure in the poppet piston chamber [141] becomes lower than the pressure that the main filling fluid creates, and lower than the floating piston chamber [170] pressure. With continued reference to FIG. 13B (the starting to open position) the main floating piston [102] starts to lift from this pressure differential, which further increases the leak fluid rate as the poppet valve [135] is further removed in distance between the bottom portion of the poppet [104] and the poppet valve seat [136] where the poppet [104] initially seats. The progressive increase in fluid flow transitions from initial dripping to more substantial flow rates as the pressure differentials continue to develop.

The valve assembly [100] creates a hysteresis effect that allows continuous filling and draining of the fluid tank [200] in a cyclical method while eliminating or reducing possible leakage during operational cycles. As further shown in FIG. 13C (the partial opened position) and heading toward to FIG. 13D, when the tank [200] approaches full capacity, the external fluid continues flowing into the tank [200] through the inlet flow path [155] with fuel under increased gauge pressure [159], with a pressure greater than the pressure required to cause the floating piston [102] to move upward. The main floating piston [102] moves away from the poppet tip [138] as the poppet valve [135] opens to begin filling, creating an increased gap between the poppet tip [138] and the poppet valve seat [136] that allows for eventual fluid flow into the tank [200] after the initial dripping phase through the main valve [150] The flow restricted pressure balancing channel [160] is filled with fluid that, together with a piston closing spring [112] located above the floating piston [102], begins to push the floating piston [102] downward to eventually reconnect with the poppet [104].

The hysteresis cycling operation enables the valve assembly [100] to accommodate the demanding operational requirements of trucks that run continuously in oil field fracing operations, where trucks may consume two to three gallons of diesel fluid per minute. Referring to FIG. 13 D, the cyclical filling and emptying method may eliminate or reduce the frequent over and underfilling of tanks [200] that may occur with conventional fluid management systems. As the level of fluid in the tank [200] increases more rapidly in the fully opened position shown in FIG. 13 D, the poppet [104] starts to rise toward the floating piston [102] so that the poppet tip [138] at the end of the poppet [104] heads back toward the poppet valve seat [136] to eventually close the poppet valve flow channel [137] toward the sealed to close position shown in FIG. 13E creating the hysteresis effect. The hysteresis effect provides the method by which continuous filling and draining of the fluid tank [200] occurs with reduced leakage compared to conventional systems.

The differential pressure balancing through the flow restricted pressure balancing channel [160] system provides sophisticated control over the valve assembly [100] operation throughout the complete operational cycle. As shown in FIG. 13 E, the poppet valve flow channel [137] is closed while a poppet closing spring [113] assist in forcing the complete seating of the poppet [104] into the poppet valve seat [136]. When the poppet [104] is in the fully seated position, the flow restricted pressure balancing channel [160] continues to build fluid that resides above the floating piston [102] because the floating piston chamber [170] is now sealed by the sealing with O-rings [110] that located where the poppet valve seat [136] exists. The pressure differential causes the floating piston [102] to start heading downward toward the direction of the actual float [127] (not shown) when the fluid flowing into the chamber is greater than the fluid existing in the floating piston chamber [170].

The progressive drip operation modes may enable the valve assembly [100] to transition between different operational states based on changing pressure conditions and fluid levels within the system. The float [127] may be anchored by a static wire guide that may include a wire rope [132] with an eyehook [133] that connects to the float [127], with the float [127] ultimately controlling the floating piston [102] to be pushed up or down. Without the poppet closing spring [113] and the piston closing spring [112] as well as the flow restricted pressure balancing channel [160], the floating piston [102] may not complete the cycling to ensure continuous filling without complete depletion of the fluid in the tank [200]. The cyclical hysteresis effect may also ensure that filling does not continue without interruption, preventing overfilling from occurring during normal operational cycles.

Alternative control configurations may incorporate electronic actuation systems to enhance the operational capabilities of the valve assembly. An electric solenoid may be used for the poppet [104] with an external loop and a pressure measuring solenoid to override the flow path around the floating piston [102], providing enhanced control over the valve operation. The solenoid system may be controlled with an external loop that measures pressure and overrides the flow restricted pressure balancing channel [160] flow path, with a tube or other manifold arrangement making this enhanced control possible. In some cases, the electronic control system may provide additional operational flexibility while maintaining the fundamental mechanical operation principles of the float-actuated valve assembly.

A number of implementations have been described. Nevertheless, it will be understood that various modifications may be made without departing from the spirit and scope of the disclosure. Accordingly, other implementations are within the scope of the following claims.

We claim:

1. A float-actuated fluid valve assembly, comprising:
a valve body having an inlet port and an outlet port;
a floating piston movably disposed within said valve body;
a poppet positioned within said valve body and configured to selectively seal against a poppet valve seat that controls fluid flow between said inlet port and said outlet port;
a float assembly operatively connected to said floating piston through a connecting mechanism, wherein said float assembly responds to changes in fluid level that actuates movement of said floating piston, which controls positioning of said poppet relative to said poppet valve seat; and
at least one piston closing spring and at least one poppet closing spring that provides compression and release capability of a floating piston actuator area and a floating piston drive area respectively, so that as fluid fills a floating piston chamber said floating piston changes position in order to release said poppet from its poppet valve seat and wherein said floating piston actuator area reduces in fluid volume that reduces said floating piston actuator area that allows said floating piston drive area to increase in fluid volume and allows more fluid to fill said float-actuated fluid valve assembly wherein fluid flows from one or more fluid holding tanks or reservoirs into said float-actuated fluid valve assembly and wherein said piston closing spring(s) and said poppet closing spring(s) are positioned to control said floating piston wherein said connecting mechanism extends between said float assembly and said floating piston and wherein fluid is drained from said float-actuated fluid valve assembly and said floating piston chamber when said floating piston actuator area increases in fluid volume and said floating piston drive area decreases in fluid volume to provide controlled cyclic fill and depletion of said float-actuated fluid valve assembly so that said float-actuated valve assembly receives some or no fluid from said one or more fluid holding tanks or reservoirs.

2. The float-actuated fluid valve assembly of claim 1, wherein said fluid is a fuel and wherein said fuel can be any fuel of any density and wherein said float-actuated fluid assembly controls said cyclic fill so that neither underfill or overfill of said fluid holding tank(s) occurs.

3. The float-actuated fluid valve assembly of claim 1, wherein said connecting mechanism comprises a wire rope, cable, and/or cord that is secured with compression sleeves positioned at both ends of said connecting mechanism.

4. The float-actuated fluid valve assembly of claim 3, wherein said compression sleeves are mechanically compressed and create permanent attachment points that resist pullout forces.

5. The float-actuated fluid valve assembly of claim 1, further comprising a poppet guide directing movement of said poppet within said valve body.

6. The float-actuated fluid valve assembly of claim 1, further comprising multiple O-rings providing sealing between various components of said valve body.

7. The float-actuated fluid valve assembly of claim 6, wherein said O-rings are constructed from Buna-N material with 70 durometer hardness.

8. The float-actuated fluid valve assembly of claim 1, wherein said at least one piston closing spring and said at least one poppet closing spring are constructed of stainless steel.

9. The float-actuated fluid valve assembly of claim 1, wherein said float assembly includes a float cage having a top cap and a bottom cap connected by connecting rods.

10. The float-actuated fluid valve assembly of claim 9, wherein said connecting rods are secured to both said top cap and said bottom cap through threaded connections.

11. The float-actuated fluid valve assembly of claim 10, wherein said threaded connections comprise hex nuts that create threaded engagement with corresponding threaded features on said connecting rods.

12. The float-actuated fluid valve assembly of claim 1, further comprising multiple sealing rings that provide fluid-tight seals between various components of said valve body.

13. The float-actuated fluid valve assembly of claim 12, wherein said sealing rings are constructed from elastomeric thermoplastics with a durometer hardness within a range of 40-90 that allows for adjustment of said float-actuated fluid valve assembly to operate for different fluids with different fluid densities.

14. A fluid system valve assembly, comprising:
a valve housing defining a flow path between an inlet portion and an outlet portion;
a movable valve element disposed within said valve housing and configured to control fluid flow through one or more flow paths;
a float mechanism responsive to liquid level changes and including a float cage having a top cap and a bottom cap connected by connecting rods;

a mechanical linkage that operatively couples said float mechanism to said movable valve element, wherein said mechanical linkage includes a flexible cable connection comprising a wire rope, cable, and/or cord secured with compression sleeves at both ends; and a compressive spring system comprising two compression springs constructed of stainless steel material that bias said movable valve element toward predetermined positions.

15. The fluid system valve assembly of claim 14, wherein said wire rope has a length selected that is at least six inches long.

16. The fluid system valve assembly of claim 15, wherein said compression sleeves are mechanically compressed to create permanent attachment points that resist pullout forces.

17. The fluid system valve assembly of claim 16, wherein said connecting rods are secured to both said top cap and said bottom cap through threaded connections comprising hex nuts.

18. A float-controlled valve apparatus, comprising:

a valve body assembly having fluid inlet and outlet connections;

a piston mechanism movably positioned within said valve body assembly;

a valve closure element configured to engage a sealing surface to regulate fluid flow;

a buoyant actuator assembly responsive to liquid level variations and optionally including a float cage having a top cap and a bottom cap connected by connecting rods;

a wire rope, cable and/or cord coupling system connecting said buoyant actuator assembly to said piston mechanism, wherein vertical displacement of said buoyant actuator assembly causes corresponding movement of said piston mechanism and valve closure element; and a sealing system with multiple O-rings constructed from thermoplastic materials that provides fluid-tight seals between components of said valve body assembly.

19. The float-controlled valve apparatus of claim 18, wherein said wire rope coupling system includes compression sleeves securing said wire rope at connection points.

20. The float-controlled valve apparatus of claim 19, wherein said compression sleeves are positioned at both ends of said wire rope that provide secure mechanical attachment.

21. The float-controlled valve apparatus of claim 20, wherein said compression sleeves are mechanically compressed to create permanent attachment points that resist pullout forces.

22. The float-controlled valve apparatus of claim 18, wherein said connecting rods are secured to both said top cap and said bottom cap through threaded connections.

23. A float-actuated fluid valve assembly, comprising:

a valve body having an inlet port and an outlet port;

a floating piston movably disposed within said valve body and having a cross-sectional area;

a poppet positioned within said valve body and configured to selectively seal against a poppet valve seat to control fluid flow between said inlet port and said outlet port, said poppet having a poppet rod extending therefrom;

a poppet guide directing movement of said poppet within said valve body;

a float assembly operatively connected to said floating piston through a wire rope connecting mechanism wherein said float assembly includes a float that is replaceable with floats of different sizes, weights and cross-sectional areas; and a flow restricted pressure balancing channel providing a controlled fluid path for pressure equalization during valve operation, wherein said cross-sectional area of said floating piston is greater than a cross-sectional area of a poppet piston chamber where said poppet operates.

24. The float-actuated fluid valve assembly of claim 23, wherein said wire rope connecting mechanism comprises a wire rope secured using compression sleeves positioned at both ends of said wire rope.

25. The float-actuated fluid valve assembly of claim 24, wherein said compression sleeves are mechanically compressed to create permanent attachment points that resist pullout forces.

26. The float-actuated fluid valve assembly of claim 23, further comprising a set of compression springs biasing said poppet toward a closed position.

27. The float-actuated fluid valve assembly of claim 26, wherein said set of compression springs is constructed of stainless steel, wherein said set of compression springs is replaceable with compression springs having different spring constants as required by various fluid densities.

28. The float-actuated fluid valve assembly of claim 23, wherein said float assembly includes a float cage having a top cap and a bottom cap connected by connecting rods.

29. The float-actuated fluid valve assembly of claim 28, wherein said connecting rods are secured to both said top cap and said bottom cap through threaded connections.

30. The float-actuated fluid valve assembly of claim 23, further comprising a poppet valve flow channel extending around said poppet and said poppet rod that provides controlled fluid flow during valve operation.

31. A fluid system valve assembly, comprising:

a valve housing defining a flow path between an inlet portion and an outlet portion;

a floating piston disposed within said valve housing and configured to move axially in response to pressure differentials;

a poppet valve element positioned within said valve housing and configured to control fluid flow through a flow path;

a poppet valve flow channel extending around said poppet valve element;

a float mechanism responsive to liquid level changes;

a wire rope that connects said float mechanism to said floating piston; and a flow restricted pressure balancing channel configured such that said flow restricted pressure balancing channel provides controlled fluid communication between chambers within said valve housing and provides an ability for fluid to flow or be stopped as needed to ensure fluid flow regulation from one or more fluid holding tanks.

\* \* \* \* \*